US006886996B2

(12) United States Patent
Shimada et al.

(10) Patent No.: US 6,886,996 B2
(45) Date of Patent: May 3, 2005

(54) OPTICAL WAVEGUIDE, OPTICAL MODULE, AND METHOD FOR PRODUCING THE SAME MODULE

(75) Inventors: Mikihiro Shimada, Daito (JP); Hiroyuki Asakura, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/874,202

(22) Filed: Jun. 24, 2004

(65) Prior Publication Data

US 2004/0234205 A1 Nov. 25, 2004

Related U.S. Application Data

(62) Division of application No. 10/455,452, filed on Jun. 6, 2003.

(30) Foreign Application Priority Data

Jun. 19, 2002 (JP) ........................................ 2002-178508

(51) Int. Cl.[7] .............................. G02B 6/36; G02B 6/00
(52) U.S. Cl. ......................................... 385/88; 385/147
(58) Field of Search ............................. 385/3–5, 14–16, 385/88–90, 24, 30, 50, 52, 55, 56, 124–126, 130–132, 140–144

(56) References Cited

U.S. PATENT DOCUMENTS

| | | | |
|---|---|---|---|
| 3,785,717 A | | 1/1974 | Croset et al. |
| 4,829,345 A | | 5/1989 | Ishioka et al. |
| 5,343,544 A | | 8/1994 | Boyd et al. |
| 5,432,873 A | | 7/1995 | Hosoya et al. |
| 5,748,825 A | | 5/1998 | Rockwell |
| 5,778,120 A | * | 7/1998 | Asakura et al. ................ 385/49 |
| 5,838,854 A | | 11/1998 | Taneya et al. |
| 5,859,943 A | * | 1/1999 | Asakura et al. ................ 385/49 |
| 6,122,416 A | | 9/2000 | Ooba et al. |
| 6,282,335 B1 | | 8/2001 | Losch et al. |
| 6,363,185 B2 | * | 3/2002 | Shekel et al. .................. 385/33 |
| 6,366,720 B1 | * | 4/2002 | Shekel et al. .................. 385/33 |

(Continued)

FOREIGN PATENT DOCUMENTS

| | | |
|---|---|---|
| EP | 0 905 546 A2 | 3/1999 |
| JP | 05-257020 | 10/1993 |
| JP | 10-160953 | 6/1998 |
| JP | 11-68705 | 3/1999 |
| JP | 2004078158 | 3/2004 |

OTHER PUBLICATIONS

Kishioka et al., "Wavelength Demultiplex Utilizing Stratified Waveguides With a Tapered Buffer Layer", ISSN 0916–8524, pp. 1491–1497, Oct. 1993.

Patent Abstracts of Japan, (JP 11–326710 dated Nov. 26, 1999).

*Primary Examiner*—Akm Enayet Ullah
(74) *Attorney, Agent, or Firm*—Wenderoth, Lind & Ponack L.L.P.

(57) ABSTRACT

An optical module of the present invention includes a first substrate 1, a second substrate 2, a PD 3, a LD 4, and an optical fiber 5. The first substrate 1 has a first optical waveguide core 1c formed therein. The second substrate 2 has a second optical waveguide core 2c formed therein. The first optical waveguide core 1c and the second optical waveguide core 2c form an optical connecting portion where the first substrate 1 and the second substrate 2 are bonded to each other. The LD 4 is capable of transmitting an optical signal via the second optical waveguide core 2c and the optical fiber 5. The PD 3 is capable of receiving an optical signal which enters the second optical waveguide core 2c from the optical fiber 5, and propagates through the first optical waveguide core 1c via the optical connecting portion formed between the first optical waveguide core 1c and the second optical waveguide core 2c.

12 Claims, 10 Drawing Sheets

U.S. PATENT DOCUMENTS

| | | | |
|---|---|---|---|
| 6,370,302 B2 * | 4/2002 | Shekel et al. | 385/52 |
| 6,377,733 B2 * | 4/2002 | Shekel et al. | 385/49 |
| 6,385,376 B1 | 5/2002 | Bowers et al. | |
| 6,456,767 B2 * | 9/2002 | Terashima | 385/49 |
| 6,459,833 B1 * | 10/2002 | Shekel et al. | 385/33 |
| 6,463,196 B2 * | 10/2002 | Shekel et al. | 385/49 |
| 6,504,978 B2 * | 1/2003 | Shekel et al. | 385/52 |
| 6,542,671 B1 | 4/2003 | Ma et al. | |
| 6,608,946 B2 | 8/2003 | Kikuchi et al. | |
| 6,633,699 B1 | 10/2003 | Legay et al. | |
| 6,643,435 B2 * | 11/2003 | Shekel et al. | 385/52 |
| 6,647,178 B2 * | 11/2003 | Shekel et al. | 385/33 |
| 6,654,524 B2 * | 11/2003 | Shekel et al. | 385/52 |
| 6,724,968 B2 | 4/2004 | Lackritz et al. | |
| 6,726,375 B2 | 4/2004 | Kato et al. | |
| 6,760,500 B2 | 7/2004 | Furuyama | |
| 2001/0016097 A1 * | 8/2001 | Shekel et al. | |
| 2001/0016101 A1 * | 8/2001 | Shekel et al. | |
| 2001/0028768 A1 * | 10/2001 | Terashina | |
| 2002/0003924 A1 * | 1/2002 | Shekel et al. | |
| 2002/0012499 A1 * | 1/2002 | Shekel et al. | |
| 2002/0018634 A1 * | 2/2002 | Korenaga et al. | |
| 2002/0054736 A1 * | 5/2002 | Shekel et al. | |
| 2002/0097958 A1 * | 7/2002 | Shekel et al. | |
| 2002/0102054 A1 * | 8/2002 | Shekel et al. | |
| 2002/0181892 A1 * | 12/2002 | Shekel et al. | |
| 2003/0007754 A1 * | 1/2003 | Teroshima | |
| 2003/0044116 A1 * | 3/2003 | Shekel et al. | |
| 2003/0142897 A1 | 7/2003 | Koike et al. | |
| 2003/0235371 A1 * | 12/2003 | Shimada et al. | |
| 2004/0047580 A1 | 3/2004 | Shimada et al. | |
| 2004/0114872 A1 | 6/2004 | Nagai | |

* cited by examiner

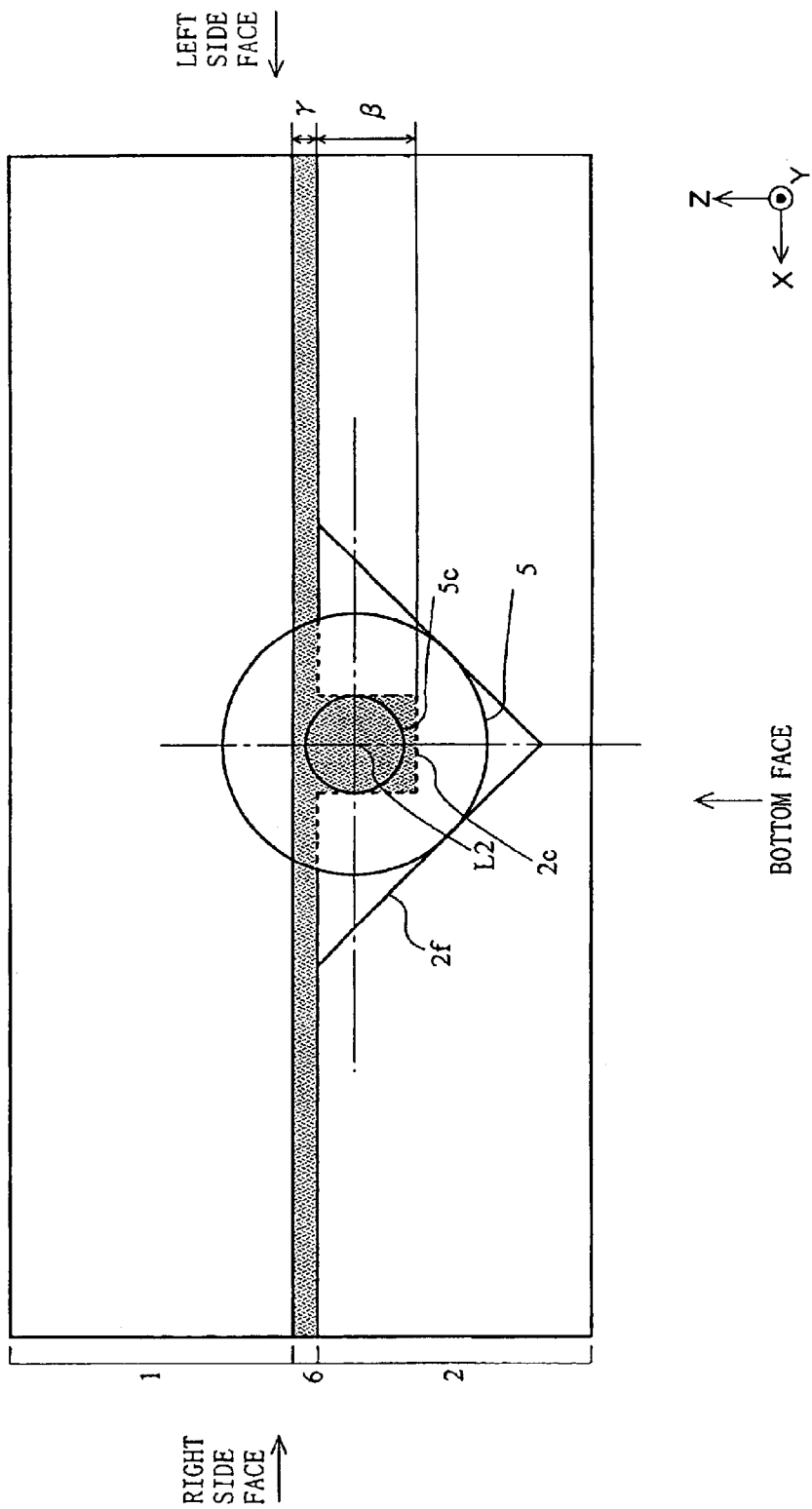

DEPENDENCE OF EQUIVALENT REFRACTIVE INDICES ON OPTICAL WAVEGUIDE DEPTH AT WAVELENGTH OF 1.3 μm

DEPENDENCE OF EQUIVALENT REFRACTIVE INDICES ON OPTICAL WAVEGUIDE DEPTH AT WAVELENGTH OF 1.55 μm

OPTICAL WAVEGUIDE, OPTICAL MODULE, AND METHOD FOR PRODUCING THE SAME MODULE

This is a Divisional Application of U.S. application Ser. No. 10/455,452, filed Jun. 6, 2003 now pending.

BACKGROUND OF THE INVENTION

1. Field of the Invention

The present invention relates to optical waveguides, an optical module, and a method for producing the optical module. More particularly, the present invention relates to: optical waveguides for causing an optical signal for use in optical communication or the like to branch off or coupling such optical signals when such optical signals propagate therethrough; an optical module using such an optical waveguide; and a method for producing such an optical module.

2. Description of the Background Art

Recent years have seen optical communication systems come into wide use in public communication, a computer network, etc. In order to realize high-speed performance and high functionality, such optical communication systems utilize broadband optical communication and have a wavelength division multiplex optical transmission function and/or an interactive optical transmission function. In the field of optical communication, studies of optical integrated circuits having various functions have been eagerly conducted for performing advanced signal processing. An optical integrated circuit includes an optical waveguide as a basic element. In the optical waveguide, a core region having a high refractive index is covered with a cladding layer having a relatively low refractive index, and light is confined within the core region and caused to propagate therethrough. Various functions are realized by arranging cores in a patterned manner. Among others, a quartz-based optical waveguide is typical of passive optical waveguides having various advantages, such as low loss properties, physical and chemical stability, and conformability to an optical fiber. In a typical method for producing an optical waveguide, flame deposition is used for forming a core cladding film and reactive ion etching is used for forming a core pattern. In addition to the flame deposition, suggested methods for forming the core cladding film include CVD (chemical vapor deposition), vacuum deposition, sputtering, etc.

Technologies for realizing a small, multifunctional, and low-cost optical waveguide by mounting an optical semiconductor element, etc., on the optical waveguide are considered as being promising and are currently under eager study. For example, Japanese Patent Laid-Open Publication No. 11-68705 discloses a module aimed at integration by mounting optical semiconductor elements, such as a semiconductor laser and a photodiode, on an Si substrate or an optical waveguide platform which is formed on the SI substrate and has the quartz-based optical waveguide formed therein.

FIG. 10 is a view illustrating a structure of the optical module disclosed in Japanese Patent Laid-Open Publication No. 11-68705. In the optical module illustrated in FIG. 10, an optical waveguide substrate 102 including a quartz-based optical waveguide core 102c is formed using flame deposition or the like, such that the optical waveguide substrate 102 and an Si substrate 101, which is previously processed by etching or the like, are stacked. A laser diode (LD) 103 and a photodiode (PD) 104 are mounted in spaces provided by removing surplus portions of a quartz-based material deposited as the optical waveguide substrate 102. The LD 103 and the PD 104 are mounted on the Si substrate 101 or the optical waveguide substrate 102.

The optical waveguide core 102c has an end surface 102ca formed in a side face of the optical waveguide substrate 102. The optical waveguide core 102c also has an end surface 102cb formed in another side face of the optical waveguide substrate 102 which is formed in the space where the PD 104 is mounted. The optical waveguide core 102c has a branch which is formed such that an optical signal propagating therethrough is reflected by a reflecting plane 102cr, which is formed at an intermediate point of the optical waveguide core 102c formed between the end surfaces 102ca and 102cb, so as to be transmitted to the end surface 102ca. The branch of the optical waveguide core 102c connects the reflecting plane 102cr with still another side face of the optical waveguide substrate 102, which is formed in the space where the LD 103 is mounted, and forms an end surface 102cc in the same side face.

The reflecting plane 102cr formed in a branching portion of the optical waveguide core 102c includes a portion of an optical filter 105. A groove is formed by processing, such as dicing, in the stacked substrates 101 and 102. The optical filter 105 is inserted into the groove. The optical filter 105 is then fixed in the groove. Specifically, the optical waveguide core 102c formed between the end surfaces 102ca and 102cb is disconnected at the intermediate point by the groove which is filled by inserting the optical filter 105. Typically, the optical filter 105 has an area sufficiently larger than a cross section of the optical waveguide core 102c. The reflecting plane 102cr is formed by bonding a portion of the optical filter 105 to the cross section of the optical waveguide core 102c at opposite sides of the optical filter 105. In order for the optical module to have a wavelength division multiplex function, etc., the optical filter 105 has properties of transmitting therethrough an optical signal, which has a wavelength within a prescribed wavelength range, and reflecting an optical signal having a wavelength out of the prescribed wavelength range.

Propagation of an optical signal through the optical module will now be described. The LD 103 outputs toward the end surface 102cc an optical signal having a wavelength within a range of wavelengths to be reflected by the optical filter 105. The optical signal output by the LD 103 propagates from the end surface 102cc through the branch of the optical waveguide core 102c and is incident on the reflecting plane 102cr. The wavelength of the optical signal lies within the range of wavelengths to be reflected by the optical filter 105, and therefore the optical signal incident on the reflecting plane 102cr is reflected by the reflecting plane 102cr, so as to propagate through the optical waveguide core 102c towards the end surface 102ca, and exits therefrom.

On the other hand, in the case where an optical signal, which has a wavelength out of the range of wavelengths to be reflected by the optical filter 105, enters the optical waveguide core 102c from the end surface 102ca, the optical signal propagates from the end surface 102ca through the optical waveguide core 102c so as to be incident on the reflecting plane 102cr. The wavelength of the optical signal lies out of the range of wavelengths to be reflected by the optical filter 105, and therefore the optical signal incident on the reflecting plane 102cr is transmitted therethrough, so as to propagate through the optical waveguide core 102c toward the end surface 102cb, and exits therefrom. The optical signal having exited from the end surface 102cb is incident on the PD 104.

However, the branching portion of the optical waveguide core 102c of the optical module is required to have a fine and highly accurate pattern formed therein in order to suppress the loss of an optical signal propagating therethrough. For example, regarding an optical signal, which is output by the LD 103 and reflected by the reflecting plane 102cr so as to exit the optical module from the end surface 102ca, an angle between the optical waveguide core 102c, which is formed between the end surfaces 102ca and 102cb, and the branch thereof is required to coincide with a reflection angle of the optical signal. The reflection angle is significantly influenced by angles between the optical filter 105, the optical waveguide core 102c, and the branch. The angles of the optical filter 105 with respect to the optical waveguide 102c and the branch are determined by the groove formed by processing the Si substrate 101 and the optical waveguide substrate 102 which are stacked as described above. The groove is required to be formed by highly accurate processing. The optical filter 105 is preferably inserted into the groove without making any gaps between them. However, it is very difficult to realize such stable dimensional accuracy, and therefore the insertion of the optical filter 105 into the groove often leaves slight gaps between them. In such a case, the gaps between the optical filter 105 and the groove are filled with an adhesive or the like which does not influence the propagation of the optical signal. However, even when the gaps are filled with the adhesive or the like, the angles of the optical filter 105 with respect to the optical waveguide core 102c and the branch thereof greatly vary depending on warping or inclination of the optical filter 105 within the groove.

In the case where the optical signal is on a single mode, it is necessary to perform alignment, assembly, and fixation with an accuracy of ±1 micrometer ($\mu$m) or less in order to suppress the loss of the optical signal propagating through the above-described optical module. In order to satisfy requirements for such alignment accuracy, a production machine, such as a highly accurate processor, is currently required. Positional adjustments, such as alignment of optical axes, are performed by a system including a multiple-axis automatic alignment mechanism, and there are significant problems in aspects of mass-productivity and economical efficiency of the optical module. Accordingly, the optical module is not suitable for mass production and it is difficult to realize a low-cost optical module.

SUMMARY OF THE INVENTION

Therefore, an object of the present invention is to provide an optical waveguide and an optical module which facilitate easy alignment of optical axes so as to realize reduction in cost without adversely affecting their performance.

Another object of the present invention is to provide a method for producing the same optical waveguide and module.

The present invention has the following features to attain the object mentioned above.

A first aspect of the present invention is directed to an optical waveguide for causing an optical signal to branch off or coupling optical signals, the waveguide comprising: a first substrate having a first optical waveguide core therein, the first optical waveguide core being parallel to a bottom face of the first substrate; and a second substrate having a second optical waveguide core therein, the second optical waveguide core being parallel to a top face of the second substrate, wherein an optical connecting portion is formed between the first and second optical waveguide cores by bonding the bottom face of the first substrate to the top face of the second substrate so as to overlap with each other, the first and second waveguide cores partially being in contact with each other.

According to the optical waveguide having the above configuration, the optical connecting portion, which is formed such that the first and second optical waveguide cores overlap with each other, realizes a function of causing a received optical signal to branch off and coupling optical signals to be transmitted. Further, it is easy to adjust the optical axes of the first optical waveguide core and the second optical waveguide core so as to realize the optical branching and coupling function, and therefore the optical waveguide can be mass-produced at a low cost.

The first optical waveguide core may be formed by injecting a first high refractive index material having a relatively high refractive index into a first concave groove which is formed so as to be parallel to the bottom face of the first substrate, the second optical waveguide core may be formed by injecting a second high refractive index material having a relatively high refractive index into a second concave groove which is formed so as to be parallel to the top face of the second substrate, and the bottom face of the first substrate and the top face of the second substrate may be bonded together by a third high refractive index material having a relatively high refractive index. Thus, the first and second optical waveguide cores can be readily formed by only injecting the first and second high refractive index materials into the molded first and second concave grooves, respectively, whereby it is possible to mass-produce low-cost optical waveguide.

The first and second substrates may have respective different refractive indices, and cross sections of the first and second optical waveguide cores may be different from each other in at least one of width and height. Thus, a function of dividing a wavelength range of optical signals to propagate can be obtained by adjusting the cross sections of the first and second optical waveguide cores and the refractive indices of the first and second substrates.

An area of the optical connecting portion may be increased or decreased by adjusting a relationship between the bottom face of the first substrate and the top face of the second substrate with respect to a bonding position. By using such adjustment so as to increase/decrease the area of the optical connecting portion where the first and second optical waveguide cores overlap with each other, it is possible to allow the received optical signal to branch off to the first and second optical waveguide cores at a desired branching ratio. It is also possible to adjust the ratio of respective optical energies transmitted from the first and second optical waveguide cores.

The first and second high refractive index materials, which are respectively injected into the first and second concave grooves, and the third high refractive index material, which bonds the bottom face of the first substrate to the top face of the second substrate, are ultra violet curable resins of the same type, for example. In this case, the first and second substrates are bonded together using a bonding material which is the same as the ultra violet resins to be injected into the first and second concave grooves respectively formed in the first and second substrates. Thus, the formation of the first and second optical waveguide cores and the bonding of the first and second substrates can be performed in a single operation process by using the same high refractive index material. Alternatively, the first and second refractive index materials may be glass-based materials of the same type. In this case, the first and second substrates are bonded together using a bonding material which is the same as the glass-based materials to be injected into the first and second concave grooves respectively formed in the first and second substrates. Thus, the formation of the first and second optical waveguide cores and the bonding of the first and second substrates can be performed in a single operation process by using the same high refractive index material.

The first and second substrates are molded together with the first and second concave grooves from a low refractive index glass-based material, for example. Alternatively, the first and second substrates may be molded together with the first and second concave grooves from a low refractive index transparent resin. Whether the first and second substrates are configured in either manner, it is possible to reduce optical loss in optical signals propagating through the first and second optical waveguide cores, thereby facilitating easy formation of cladding. Alignment of the first and second substrates may be performed by using their respective alignment markers provided in prescribed positions. By using the markers respectively provided to the first and second substrates, it is possible to facilitate easy alignment of the optical axes of the first and second substrates.

A second aspect of the present invention is directed to an optical module for causing an optical signal to branch off, or coupling optical signals, so as to propagate through an optical waveguide and an optical element, the optical module comprising: a first substrate having a first optical waveguide core formed therein, the first optical waveguide core being parallel to a bottom face of the first substrate; a second substrate having a second optical waveguide core therein, the second optical waveguide core being parallel to a top face of the second substrate; an optical fiber fixed to at least one of the first and second substrates; and a plurality of optical elements mounted on a part of the top face of the second substrate so as to be optically connected to an end surface of each of the first and second optical waveguide cores, wherein an optical connecting portion is formed between the first and second optical waveguide cores by bonding the bottom face of the first substrate to the top face of the second substrate so as to overlap with each other, the first and second waveguide cores partially being in contact with each other.

According to the optical module having the above configuration, the optical connecting portion, which is formed such that the first and second optical waveguide cores overlap with each other, realizes a function of causing a received optical signal to branch off and coupling optical signals to be transmitted. Further, it is easy to adjust the optical axes of the first optical waveguide core and the second optical waveguide core so as to realize the optical branching and coupling function, and therefore the optical waveguide can be mass-produced at a low cost. Furthermore, the optical connecting portion of the optical module allows an optical signal, which is received via the optical signal, to branch off, or allows optical signals, which are transmitted by a plurality of optical elements, to be coupled with each other, so as to propagate through the optical module.

The first optical waveguide core may be formed by injecting a first high refractive index material having a relatively high refractive index into a first concave groove which is formed so as to be parallel to the bottom face of the first substrate, the second optical waveguide core may be formed by injecting a second high refractive index material having a relatively high refractive index into a second concave groove which is formed so as to be parallel to the top face of the second substrate, and the bottom face of the first substrate and the top face of the second substrate may be bonded together by a third high refractive index material having a relatively high refractive index. The first and second substrates may have respective different refractive indices, and cross sections of the first and second optical waveguide cores may be different from each other in at least one of width and height. An area of the optical connecting portion is increased or decreased by adjusting a relationship between the bottom face of the first substrate and the top face of the second substrate with respect to a bonding position.

The first and second high refractive index materials, which are respectively injected into the first and second concave grooves, and the third high refractive index material, which bonds the bottom face of the first substrate to the top face of the second substrate, are ultra violet curable resins of the same type, for example. Alternatively, the first through third high refractive index materials may be glass-based materials of the same type.

The first and second substrates are molded together with the first and second concave grooves from a low refractive index glass-based resin, for example. Alternatively, the first and second substrates may be molded together with the first and second concave grooves from a low refractive index transparent resin.

An optical fiber positioning groove may be formed on at least one of the first and second substrates, the optical fiber positioning groove aligning an optical axis of the optical fiber with an optical axis of another end surface of either the first or second optical waveguide core by fixing the optical fiber to the optical fiber positioning groove along inner surfaces thereof. By fixing the optical fiber along the optical fiber positioning groove, it is possible to readily align an optical axis of the first or second optical waveguide core to the optical fiber. Alternatively, each of the first and second substrate maybe formed by molding which uses a molding die for shaping at least one groove selected from the group consisting of the first concave groove, the second concave groove, and the optical fiber positioning groove. In this case, each of the first and second substrates can be integrally molded together with the first concave groove, the second concave groove, or the optical fiber positioning groove by using a molding die for shaping at least one groove selected from the group consisting of the first concave groove, the second concave groove, and the optical fiber positioning groove. Thus, it is possible to mass-produce optical modules at a low cost.

The plurality of optical elements are optical semiconductor elements, a transmission line is formed on the top face of the second substrate, and the plurality of optical elements are electrically connected to the transmission line. The transmission line is either a microstrip line or a coplanar line. Thus, it is possible to configure the second substrate so as to include an optical integrated circuit having various functions integrated therein.

A third aspect of the present invention is directed to a method for producing an optical module for allowing an optical signal to propagate through an optical waveguide and an optical element, the method comprising: a first substrate molding step of molding a first substrate having a first concave groove formed in a bottom face thereof, the first concave groove being parallel to the bottom face of the first substrate; a second substrate molding step of molding a second substrate having a second concave groove formed in a top face thereof, the second concave groove being parallel to the top face of the second substrate; an optical element mounting step of mounting the optical element on the top face of the second substrate at a prescribed position; a high refractive index material injecting step of injecting a high refractive index material having a refractive index, which is relatively higher than refractive indices of the first and second substrates, into the first concave groove formed in the first substrate to form a first optical waveguide core, and applying the high refractive index material to at least the bottom face of the first substrate; a position adjusting step of adjusting a position of the first substrate, such that the first substrate becomes parallel to the top face of the second substrate, based on an optical axis of the optical element mounted on the second substrate, and placing the first and second substrates on one another, such that the first and second waveguide cores are partially in contact with each other, thereby forming an optical connecting portion between the first and second optical waveguide cores; and a bonding step of bonding the bottom face of the first substrate to the top face of the second substrate so as to inject the high refractive index material, which is applied to the bottom face of the first substrate, into the second concave groove formed in the second substrate, thereby forming a second optical waveguide core.

According to the method having the above configuration, a high refractive index material having a refractive index, which is relatively higher than refractive indices of the first and second substrates, is injected into the first and second concave grooves. The high refractive index material injected into the first and second concave grooves functions as the first and second optical waveguide cores. Thus, by using such a high refractive index material, it is possible to readily form the optical waveguide cores. Further, the optical connecting portion, which is formed such that the first and second optical waveguide cores overlap with each other, realizes an optical module having a function of causing a received optical signal to branch off and coupling optical signals to be transmitted. Furthermore, it is easy to adjust the optical axes of the first optical waveguide core and the second optical waveguide core so as to realize the optical branching and coupling function, and therefore the optical waveguide can be mass-produced at a low cost. Further still, it is possible to readily adjust optical axes of the first and second optical waveguide cores and optical elements of the optical module in a height direction. The optical axes can be readily adjusted in other directions by adjusting the positions of the first substrate along a direction parallel to the top face of the second substrate. Therefore, it is possible to realize reduction in cost, which is advantageous for mass production. Further still, the first and second optical waveguide cores can be readily formed, and the first and second substrates can be readily molded together with the first and second concave grooves. Thus, it is possible to mass-produce optical modules at a low cost.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a back view used for explaining a structure of the optical module illustrated in FIG. 1, which is viewed from a back face;

DESCRIPTION OF THE PREFERRED EMBODIMENTS

Figure 1:
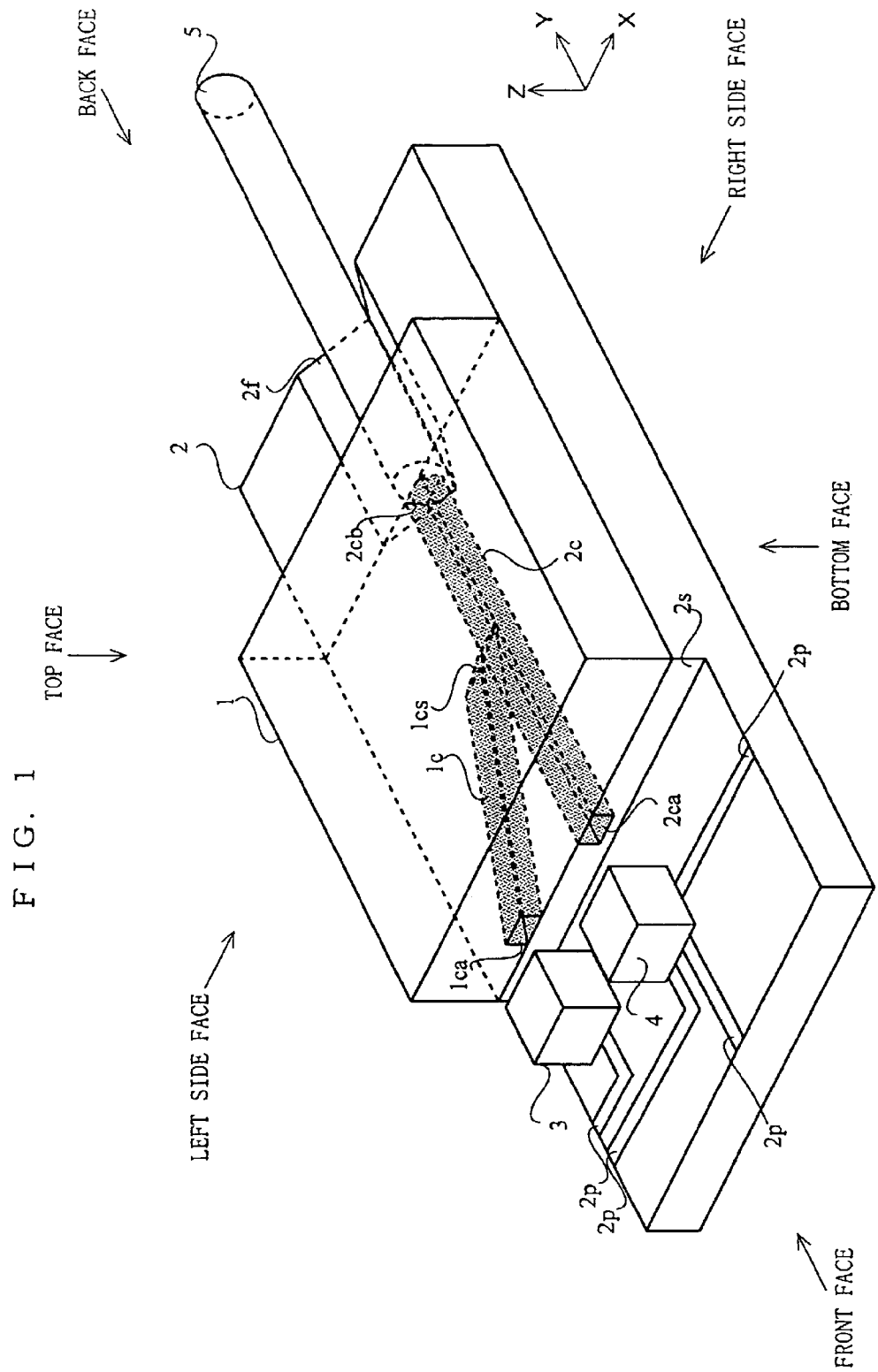
FIG. 1 is a perspective view used for explaining a structure of an optical module according to an embodiment of the present invention.

A structure of an optical module according to an embodiment of the present invention will be described with reference to FIG. 1. FIG. 1 is a perspective view of the optical module. In FIG. 1, the optical module includes a first substrate 1, a second substrate 2, a photodiode (PD) 3, a laser diode (LD) 4, and an optical fiber 5. In the following description, a face of the optical module viewed from the side of the PD 3 and the LD4 is referred to as the "front face", a face of the optical module viewed from the side of the optical fiber 5 is referred to as the "back face", a face of the optical module viewed from the side of the first substrate 1 is referred to as the "top face", a face of the optical module viewed from the side of the second substrate 2 is referred to as the "bottom face", a face of the optical module which is on the right side of the front is referred to as the "right side face", and a face of the optical module which is on the left side of the front is referred to as the "left side face". As will be described later, the first substrate 1, the second substrate 2, and the optical fiber 5 are fixed together by a bonding material such as an adhesive. In order to simplify the description, such a bonding material is not illustrated in FIG. 1.

The second substrate 2 has a substantially rectangular solid-like shape and a step is formed on a top face thereof along a height direction (the Z-axis direction illustrated in the figure). The step divides the top face such that an upper stage surface and a lower stage surface are formed so as to be parallel to each other. A step forming surface 2s, which forms the step, is formed so as to face the front face side of the second substrate 2.

Part of the upper stage surface of the second substrate 2 is bonded to a bottom face of the first substrate 1. Note that the bottom face of the first substrate 1 and the part of the upper stage surface of the second substrate 2 are bonded to each other by a prescribed bonding material which is formed to a thickness of y. The details of the bonding portion are not illustrated in the figure but will be described later. The second substrate 2 has a second optical waveguide core 2c formed therein. The second optical waveguide core 2c is formed in the second substrate 2 so as to be positioned to contact a bonding surface bonded to the bottom face of the first substrate 1. The second optical waveguide core 2c is formed along the Y-axis direction illustrated in the figure so as to extend between a substantial center of the upper stage surface of the second substrate 2 and a substantial center of the step forming surface 2s. The second optical waveguide core 2c has an end surface 2ca, which is formed in the step forming surface 2s (on the front face side), and an end surface 2cb, which is formed at the substantial center of the second substrate 2 (on the back face side).

The second substrate 2 has an optical fiber positioning groove 2f which is formed in the upper stage surface thereof so as to be concave with respect to the upper stage surface. The optical fiber positioning groove 2f is formed along the same direction as that of the second optical waveguide core 2c and extends between a surface, which includes the end surface 2cb of the second optical waveguide core 2c positioned at the substantial center of the second substrate 2, and the back face of the second substrate 2 in the Y-axis direction. In the following description, an opening, which is formed by the optical fiber positioning groove 2f at the back face side of the second substrate 2, is referred to as the "back face opening", and the surface, which includes the end surface 2cb of the second optical waveguide core 2c and is formed by the optical fiber positioning groove 2f, is referred to as the "front face of the optical fiber positioning groove 2f". The details of the positions of the second optical waveguide core 2c and the optical fiber positioning groove 2f will be described later.

The second substrate 2 has a prescribed electrode pattern and a transmission line 2p which are formed on the lower stage surface thereof. The transmission line 2p formed on the lower stage surface of the second substrate 2 may be a microstrip line or a coplanar line.

The first substrate 1 has a substantially rectangular solid-like shape and the bottom face thereof is bonded to part of the upper stage surface of the second substrate 2 such that a front face of the first substrate 1 and the step forming surface 2s are positioned on the same plane. The first substrate 1 has a first optical waveguide core 1c formed therein. The first optical waveguide core 1c is formed in the first substrate 1 so as to be positioned to contact a bonding surface bonded to the part of the upper stage surface of the second substrate 2. The first optical waveguide core 1c is formed so as to extend between a substantial center of the first substrate 1 and a portion of a front face of the first substrate 1, which is positioned so as to deviate a prescribed distance from the center of the front face to the side of a left side face of the first substrate 1, along a direction which makes a prescribed angle with respect to the Y-axis direction and the second optical waveguide core 2c. The first optical waveguide core 1c has an end surface 1ca formed in the front face thereof. The first optical waveguide core 1c also has the other end surface formed by an inclined surface 1cs provided within the first substrate 1 in the vicinity of a substantial center of the bottom face of the first substrate 1. A portion including the other end surface of the first optical waveguide core 1c is formed between the inclined surface 1cs and the bottom face of the first substrate 1, and thus has a narrowing wedge-like shape. The narrowest portion of the first optical waveguide core 1c meets the bottom face of the first substrate 1. By bonding the first substrate 1 and the second substrate 2 together, a surface of the portion including the other end surface of the first optical waveguide core 1c, which is formed as part of the bottom face of the first substrate 1, is connected to at least a portion of a surface of the second optical waveguide core 2c on the top face side via the bonding material, so that an optical connecting portion is formed between the first substrate 1 and the second substrate 2. The inclined surface 1cs is formed in the Z-axis direction (on the top face side) with respect to the optical connecting portion which connects the first optical waveguide core 1c to the second optical waveguide core 2c. The details of the position of the first optical waveguide core 1c will be described later.

The PD 3 and the LD 4 are mounted on the lower stage surface of the second substrate 2. Specifically, the PD 3 is mounted such that an optical axis of a light receiving portion thereof is aligned with an optical axis of an optical signal output from the end surface 1ca of the first optical waveguide core 1c which is formed in the front face of the first substrate 1. The LD 4 is mounted such that an optical axis of a light emitting portion thereof is aligned with an optical axis of the end surface 2ca of the second optical waveguide core 2c which is formed in the step forming surface 2s of the second substrate 2. The details of the positions of the PD 3 and the LD 4 will be described later. The PD 3 and the LD 4 are electrically connected with the electrode pattern and the transmission line 2p which are formed on the lower stage surface of the second substrate 2.

The optical fiber 5 is fixed to the second substrate 2 along the optical fiber positioning groove 2f formed therein by a prescribed bonding material. The optical fiber 5 is placed such that an optical axis thereof is aligned with the optical axis of the second optical waveguide core 2c formed in the second substrate 2, and an end surface of the optical fiber 5 is bonded to the end surface 2cb of the second optical waveguide core 2c. Specifically, the optical axes of the optical fiber 5, the second optical waveguide core 2c, and the light emitting portion of the LD 4 are aligned with each other. The LD 4 can transmit an optical signal via the second optical waveguide core 2c and the optical fiber 5. The PD 3 can receive an optical signal which is output from the optical fiber 5 to the second optical waveguide core 2c so as to propagate through the first optical waveguide core 1c via the aforementioned optical connecting portion formed between the first optical waveguide core 1c and the second optical waveguide core 2c. Propagating operations of such optical signals and the details of the position of the optical fiber 5 will be described later.

Figure 2:
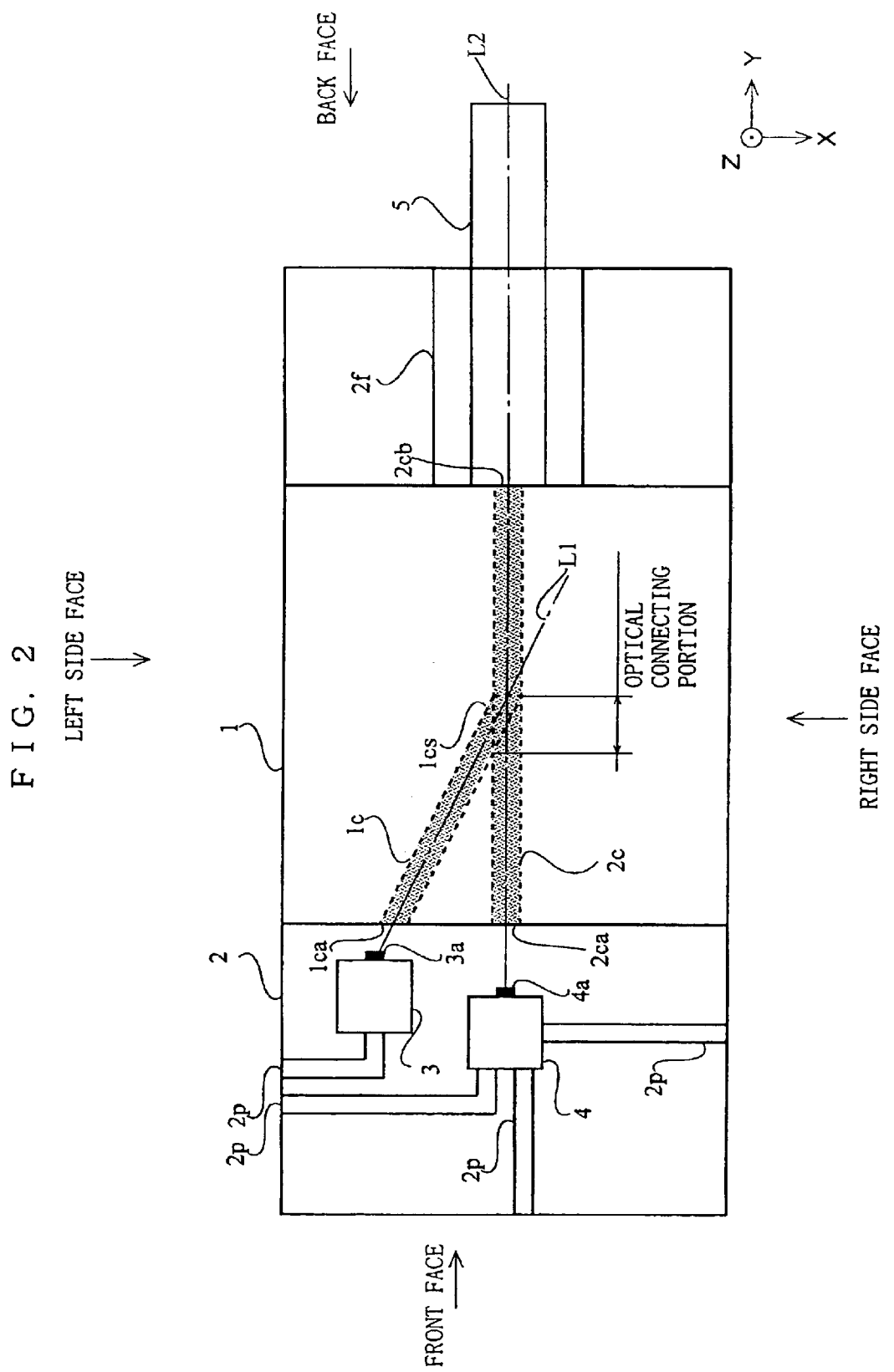
FIG. 2 is a top view used for explaining a structure of the optical module illustrated in FIG. 1, which is viewed from a top face.

Next, referring to FIG. 2, the optical module of the present invention will be described with respect to the structure viewed from the side of the top face thereof. As described above, the second substrate 2 has the second optical waveguide core 2c formed therein. The second optical waveguide core 2c is formed along the Y-axis direction so as to extend between the end surface 2ca, which is formed at the substantial center of the step forming surface 2s, and the end face 2cb formed on the same plane as the front face of the optical fiber positioning groove 2f, which is formed at the substantial center of the upper stage surface of the second substrate 2. The second optical waveguide core 2c has optical axis L2 which is aligned with optical axes of the optical fiber 5, which is placed along the optical fiber positioning groove 2f, and a light emitting portion 4a of the LD 4 mounted on the lower stage surface of the second substrate 2. The end surface 2cb of the second optical waveguide core 2c is bonded to an end surface of the optical fiber 5.

On the other hand, the first substrate 1 has the first optical waveguide core 1c formed therein. As described above, the first optical waveguide core 1c is formed so as to extend between the end surface 1ca, which is positioned so as to deviate a prescribed distance from the center of the front face to the side of the left side face of the first substrate 1, and the inclined surface 1cs, which is formed at the substantial center of the first substrate 1, along a direction which makes a prescribed angle with respect to the Y-axis direction and the second optical waveguide core 2c. The first optical waveguide core 1c has optical axis L1 which crosses a light receiving portion 3a of the PD 3 mounted on the lower stage surface of the second substrate 2. Portions of the first optical waveguide core 1c and the second optical waveguide core 2c overlap with each other in the Z-axis direction (a direction perpendicular to the face of FIG. 2). The overlapping portions form the aforementioned optical connecting portion. The inclined surface 1cs is positioned along the Z-axis direction such that at least a portion thereof overlaps with the optical connecting portion, where the first optical waveguide core 1c and the second optical waveguide core 2c overlap with each other along the Z-axis direction. In FIG. 2, the optical axis L1 of the first optical waveguide core 1c and the optical axis L2 of the second optical waveguide core 2c are illustrated as straight lines. However, the first optical waveguide core 1c may be provided in a curved form such that the optical axis L1 becomes substantially parallel to the optical axis L2 in the vicinity of the optical connecting portion and the entire inclined surface 1cs is included in the optical connecting portion in the Z-axis direction.

Figure 3:
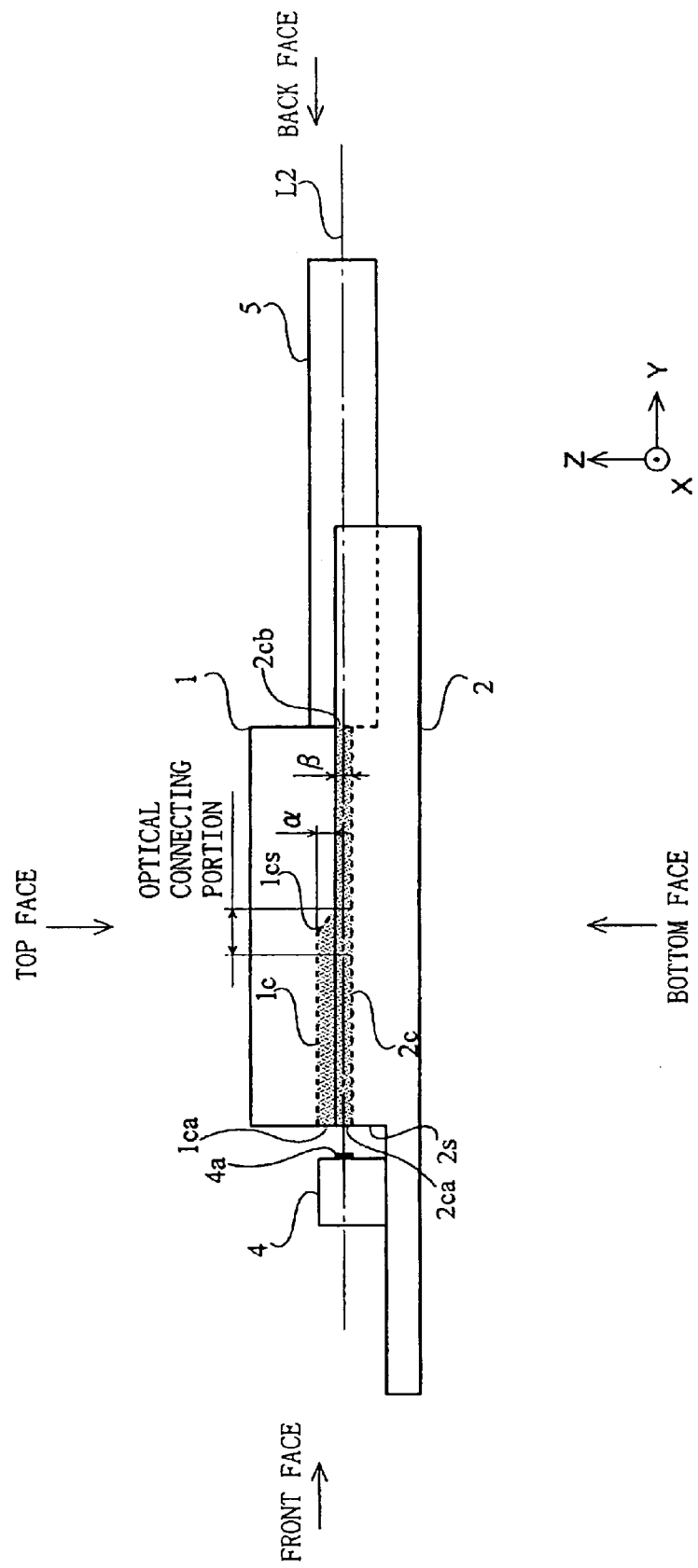
FIG. 3 is a right side view used for explaining a structure of the optical module illustrated in FIG. 1, which is viewed from a right side face.

Next, referring to FIG. 3, the optical module of the present invention will be described with respect to the structure viewed from the side of the right side face thereof. In FIG. 3, as described above, the bottom face of the first substrate 1 is bonded to part of the upper stage surface of the second substrate 2 by a bonding material (not illustrated). The second optical waveguide core 2c is formed in the second substrate 2 so as to have depth $\beta$ in the Z-axis direction and come into contact with the bonding portion. The first optical waveguide core 1c is formed in the first substrate 1 so as to have depth $\alpha$ in the Z-axis direction and come into contact with the bonding portion. The first optical waveguide core 1c and the second optical waveguide core 2c are connected to each other via the aforementioned bonding material in the optical connecting portion, where the first optical waveguide core 1c and the second optical waveguide core 2c overlap with each other in the Z-axis direction. The LD 4 is mounted on the lower stage surface of the second substrate 2 and the optical fiber 5 is fixed to the second substrate 2 by a bonding material (not illustrated) along the optical fiber positioning groove 2f formed in the second substrate 2, such that the front face of the optical fiber positioning groove 2f formed in the second substrate 2, the back face of the first substrate 1, and an end surface of the optical fiber 5 are aligned with each other on the same plane. Specifically, the end surface of the optical fiber 5 is bonded to a portion of the front face of the optical fiber positioning groove 2f and a portion of the back face of the first substrate 1. The front face of the first substrate 1 is bonded to the step forming surface 2s formed on the front face side of the second substrate 2 so as to be aligned with each other on the same plane. The optical fiber 5, the second optical waveguide core 2c, and the LD 4 are positioned such that the optical axes of the optical fiber 5 and the second optical waveguide core 2c and the center of the light emitting portion 4a of the LD 4 are aligned with each other along the optical axis L2. The PD 3 is mounted on the lower stage surface of the second substrate 2 such that the light receiving portion 3a of the PD 3 crosses the optical axis L1 of the first optical waveguide core 1c. The illustration of such mounting is omitted in the figure.

Figure 4:
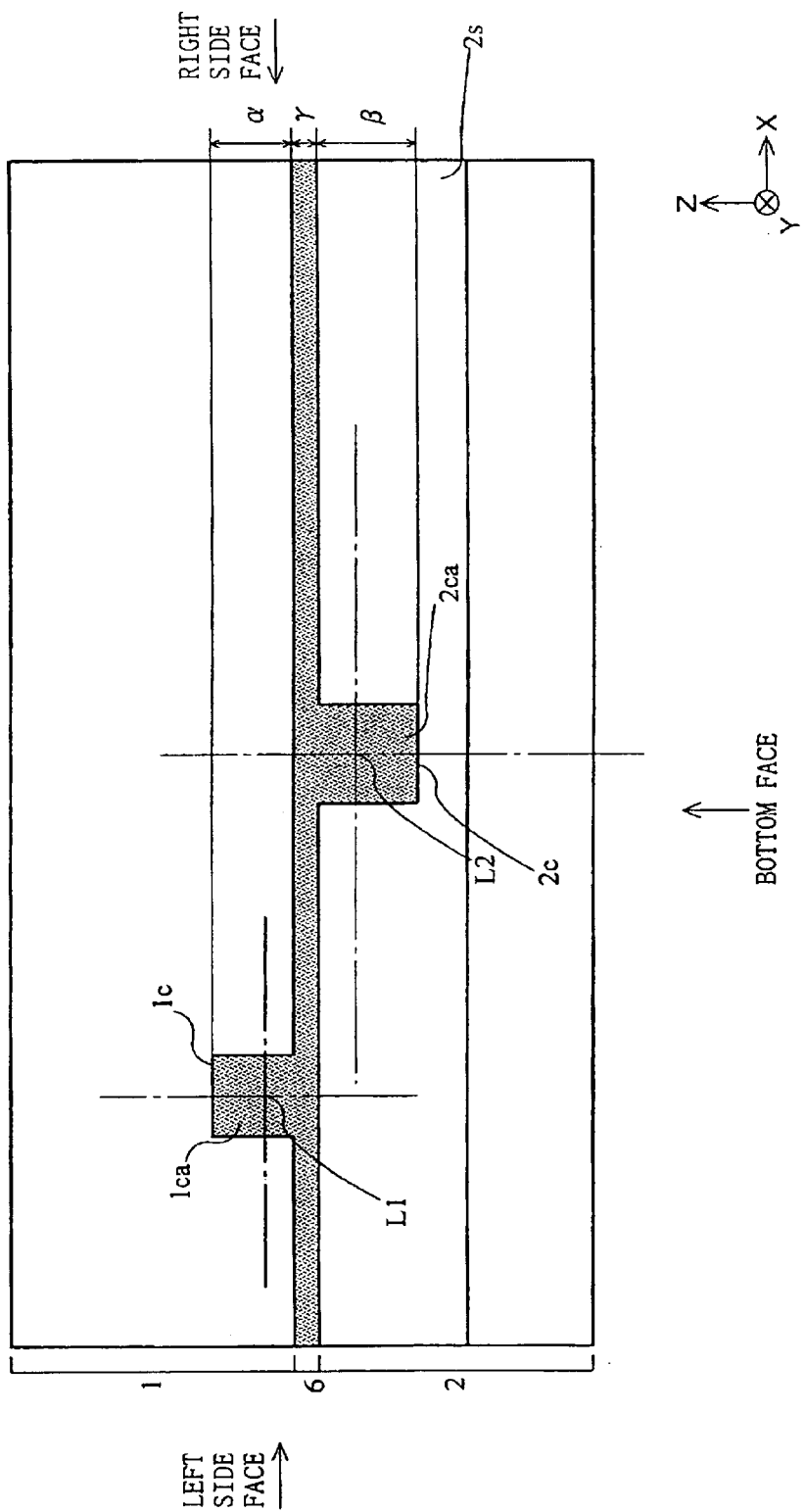
FIG. 4 is a front view used for explaining a structure of the optical module illustrated in FIG. 1, which is viewed from a front face.

Next, referring to FIG. 4, the optical module of the present invention will be described with respect to the structure viewed from the side of the front face thereof. In FIG. 4, in order to simplify the illustration, the PD 3 and the LD 4 provided on the front side of the optical module are omitted. As described above, the bottom face of the first substrate 1 and portion of the upper stage surface of the second substrate 2 are bonded together by the prescribed bonding material. The bonding material forms a bonding material layer 6 having bonding material thickness y. A high refractive index material, such as a glass-based material or an ultra violet (UV) curable resin, is preferably used as the bonding material and a material for the first optical waveguide core 1c and the second optical waveguide core 2c. As described above, the first optical waveguide core 1c and the second optical waveguide core 2c are formed so as to come into contact with the bonding material layer 6, and therefore the bonding material layer 6, the first optical waveguide core 1c, and the second optical waveguide core 2c can be integrally formed together when formed of the same material. In this manner, by forming the bonding material layer 6, the first optical waveguide core 1c, and the second optical waveguide core 2c using the same bonding material, easy production of the optical module, which will be described later, can be facilitated.

The optical module of the present invention will now be described with respect to positions of optical axes of the first optical waveguide core 1c and the second optical waveguide core 2c. As described above, the bonding material layer 6, the first optical waveguide core 1c, and the second optical waveguide core 2c are formed of the same high refractive index material, such as a glass-based material or a UV curable resin, such that the bonding material layer 6 has bonding material thickness y, and the first optical waveguide core 1c and the second optical waveguide core 2c respectively have depths $\alpha$ and $\beta$ in the height direction (the Z-axis direction). In such a case, the position of the optical axis L1 of the first optical waveguide core 1c in the Z-axis direction is represented by $(\alpha+\gamma)/2$, and the position of the optical axis L2 of the second optical waveguide core 2c in the Z-axis direction is represented by $(\beta+\gamma)/2$. In the optical module of the present invention, the optical axes of the first optical waveguide core 1c and the second optical waveguide core 2c can be readily aligned with the optical axes of the light receiving portion 3a of the PD 3 and the light emitting portion of the LD 4, respectively, in the Z-axis direction by preadjusting heights of the optical axes L1 and LD2, the PD 3, and the LD 4, such that a height from the lower stage surface of the second substrate 2 to the optical axis L1 in the same plane as the step forming surface 2s becomes equal to a height from a mounting surface of the PD 3 to the light receiving portion 3a, and a height from the lower stage surface of the second substrate 2 to the optical axis L2 in the same plane as the step forming surface 2s becomes equal to a height from a mounting surface of the LD 4 to the light emitting portion 4a.

Next, referring to FIG. 5, the optical module of the present invention will be described with respect to the structure viewed from the side of the back face thereof. In FIG. 5, as described above, the bottom face of the first optical waveguide core 1c and a portion of the upper stage surface of the second substrate 2 are bonded together by the bonding material layer 6. The opening of the optical fiber positioning groove 2f formed in the second substrate 2 has a cross section in the form of an isosceles triangle. A line through vertices of angles between two equal sides of isosceles triangles is parallel to the optical axis L2 in the Z-axis direction, and two lines through vertices of angles between other combinations of sides of the isosceles triangles extend along the upper stage surface of the second substrate 2. The optical fiber 5 is placed along the optical fiber positioning groove 2f from the back face opening and is fixed to the second substrate 2 such that the perimeter thereof contacts the optical fiber positioning groove 2f at two places in each cross section.

The optical module of the present invention will now be described with respect to positions of optical axes of the second optical waveguide core 2c and a core 5c of the optical fiber 5. In the case where the bonding material layer 6 and the second optical waveguide core 2c are formed of the same high refractive index material, such as a glass-based material or a UV curable resin, such that the bonding material layer 6 has bonding material thickness γ and the second optical waveguide core 2c has depth β in the height direction of the second substrate 2 (the Z-axis direction), the position of the optical axis L2 of the second optical waveguide core 2c in the Z-axis direction is represented by (β+γ)/2. The optical fiber positioning groove 2f is formed such that an optical axis of the optical fiber 5, which is placed along inner faces of the optical fiber positioning groove 2f, is aligned with the optical axis L2 of the optical fiber positioning groove 2f. Thus, the optical axis of the core 5c of the optical fiber 5 can be readily aligned with the optical axis L2 of the second optical waveguide core 2c by placing and fixing the optical fiber 5 along the optical fiber positioning groove 2f.

Next, operations of optical signals transmitted/received by the optical module of the present invention will be described with reference to FIGS. 1 to 5. The optical signal received by the optical module propagates through the optical fiber 5 and enters the second optical waveguide core 2c from an end surface of the optical fiber 5. In this case, the end surface of the optical fiber 5 is bonded to the end surface 2cb of the second optical waveguide core 2c, and the optical axes of the optical fiber 5 and the optical waveguide core 2c are aligned with each other. Thus, the optical signal can propagate with an extremely small loss.

The optical signal having entered the second optical waveguide core 2c propagates through the second optical waveguide core 2c and reaches the aforementioned optical connecting portion. In the optical connecting portion, the first optical waveguide core 1c and the second optical waveguide core 2c are optically connected to each other via the bonding material layer 6. Therefore, the optical signal branches off from the optical connecting portion through the bonding material layer 6 to the first optical waveguide core 1c. Specifically, the optical signal is split so as to propagate through both the first optical waveguide core 1c and the second optical waveguide core 2c.

A wavelength of the optical signal propagating through the first optical waveguide core 1c will now be described. In general, the range of wavelengths of an optical signal, which can be guided to an optical waveguide, depends on refractive indices of a core and cladding, a size of the core, etc. The refractive indices of the core and cladding vary depending on the wavelengths of the optical signal. An exemplary case where zero-order mode optical signals having respective wavelength of 1.3 μm and 1.55 μm are guided to the optical waveguide will be described.

Figure 6A:
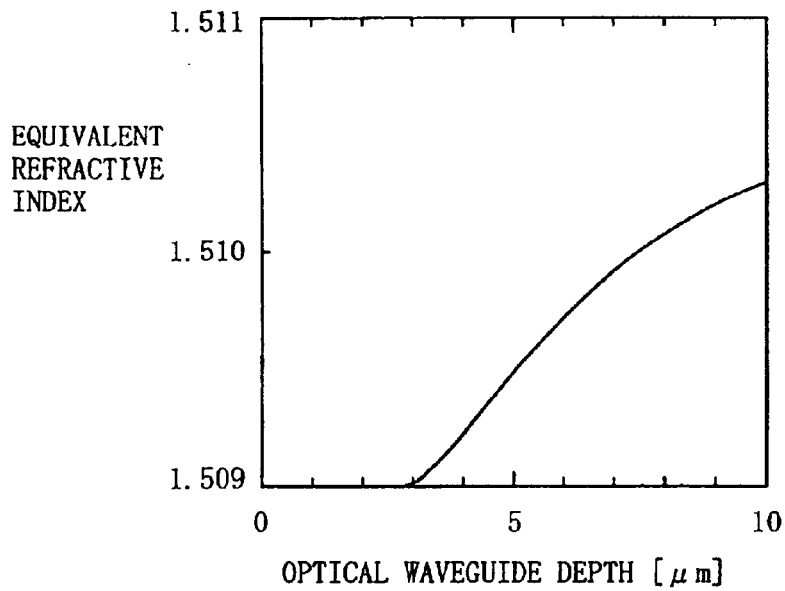
FIG. 6A is a graph illustrating a dependence of equivalent refractive indices of the optical module illustrated in FIG. 1 on optical waveguide depth at a wavelength of 1.3 $\mu$m.
Figure 6B:
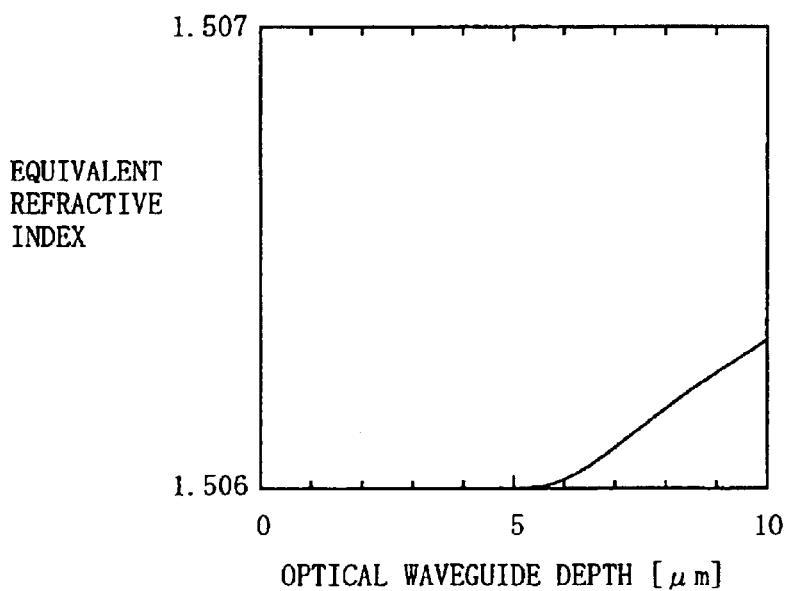
FIG. 6B is a graph illustrating a dependence of equivalent refractive indices of the optical module illustrated in FIG. 1 on optical waveguide depth at a wavelength of 1.55 $\mu$m.

FIG. 6A is a graph illustrating a dependence of equivalent refractive indices on optical waveguide depth at a wavelength of 1.3 m. FIG. 6B is a graph illustrating a dependence of equivalent refractive indices on optical waveguide depth at a wavelength of 1.55 μm. In both FIGS. 6A and 6B, the horizontal axis indicates optical waveguide depth (μm) and the vertical axis indicates equivalent refractive index.

In FIG. 6A, it is assumed that the optical module of the present invention is configured such that a refractive index at a wavelength of 1.3 μm of the first optical waveguide core 1c is 1.511, a refractive index at a wavelength of 1.3 μm of portions of the first substrate 1 excluding the first optical waveguide core 1c is 1.504, and a refractive index at a wavelength of 1.3 μm of portions of the second substrate 2 excluding the second optical waveguide core 2c is 1.509. FIG. 6A illustrates a dependence of equivalent refractive indices on depth of the first optical waveguide core 1c of the optical module configured to have the above-described refractive indices. Note that the depth of the first optical waveguide core 1c indicated in the graph of FIG. 6A includes the thickness of the bonding material layer 6, i.e., the depth of the first optical waveguide core 1c corresponds to a dimension represented by depth α+thickness γ (see FIG. 4).

As illustrated in FIG. 6A, the solid line indicating the dependence on depth of the first optical waveguide core 1c meets the horizontal axis, which indicates an equivalent refractive index of 1.509, at a depth of 2.8 μm. In the region below the equivalent refractive index of 1.509, the refractive index at a wavelength of 1.3 μm of the second substrate 2 is less than 1.509, and therefore there is no guided mode in such a region. Specifically, in the case where a cutoff depth of the zero-order mode optical signal having a wavelength of 1.3 μm is 2.8 μm, when the depth α+γ of the first optical waveguide core 1c is greater than 2.8 μm, the zero-order mode optical signal having a wavelength of 1.3 μm is guided to the first optical waveguide core 1c.

On the other hand, in FIG. 6B, it is assumed that the optical module is configured such that a refractive index at a wavelength of 1.55 μm of the first optical waveguide core 1c is 1.507, a refractive index at a wavelength of 1.55 μm of portions of the first substrate 1 excluding the first optical waveguide core 1c is 1.501, and a refractive index at a wavelength of 1.55 μm of portions of the second substrate 2 excluding the second optical waveguide core 2c is 1.506. FIG. 6B illustrates a dependence of equivalent refractive indices on depth of the first optical waveguide core 1c of the optical module configured to have the above-described refractive indices. Note that the depth of the first optical waveguide core 1c indicated in the graph of FIG. 6B also corresponds to a dimension, which includes the thickness of the bonding material layer 6, and is represented by depth α+thickness γ (see FIG. 4).

As illustrated in FIG. 6B, the solid line indicating the dependence on depth of the first optical waveguide core 1c meets the horizontal axis, which indicates an equivalent refractive index of 1.506, at a depth of 5.3 μm. In the region below the equivalent refractive index of 1.506, the refractive index at a wavelength of 1.55 μm of the second substrate 2 is less than 1.506, and therefore there is no guided mode in such a region. Specifically, in the case where a cutoff depth of the zero-order mode optical signal having a wavelength of 1.55 μm is 5.3 μm, when the depth α+γ of the first optical waveguide core 1c is greater than 5.3 μm, the zero-order mode optical signal having a wavelength of 1.55 μm is guided to the first optical waveguide core 1c. Note that in the case where the second optical waveguide core 2c is formed of the same material as the first optical waveguide core 1c, the dependence on the depth of the second optical waveguide core 2c indicates characteristics similar to the dependence on the depth of the first optical waveguide core 1c.

For example, the optical module is configured based on the above-described dependences of equivalent refractive indices on depths of the first optical waveguide core 1c and the second optical waveguide core 2c, such that a total dimension of depth a of the first optical waveguide core 1c and thickness γ of the bonding material layer 6 is α+γ=4 μm, and a total dimension of depth β of the second optical waveguide core 2c and thickness γ of the bonding material layer 6 is β+γ=8 μm. In such a case, when optical signals, which have wavelengths of 1.3 μm and 1.55 μm, respectively, enter the second optical waveguide core 2c via the optical fiber 5, only the optical signal having a wavelength of 1.3 μm is guided to the first optical waveguide core 1c. Thus, the optical module of the present invention can obtain a desired wavelength dividing function by changing respective depths α and β of the first optical waveguide core 1c and the second optical waveguide core 2c and thickness γ of the bonding material layer 6.

A method for setting depths α and β of the first optical waveguide core 1c and the second optical waveguide core 2c and thickness γ of the bonding material layer 6 of the above-described optical module having a desired wavelength dividing function will now be described. Here, zero-order mode optical signals having wavelengths $\lambda_1$ and $\lambda_2$ ($\lambda_1 < \lambda_2$) are guided to the second optical waveguide core 2c and only the zero-order mode optical signal having wavelength $\lambda_1$ is guided to the first optical waveguide core 1c. Both the first optical waveguide core 1c and the second optical waveguide core 2c have a refractive index $n_{11}$ at wavelength $\lambda_1$ and a refractive index $n_{12}$ at wavelength $\lambda_2$. The portions of the second substrate 2 excluding the second optical waveguide core 2c has a refractive index $n_{21}$ at wavelength $\lambda_1$ and a refractive index $n_{22}$ at wavelength $\lambda_2$. The portions of the first substrate 1 excluding the first optical waveguide core 1c has a refractive index $n_{31}$ at wavelength $\lambda_1$ and a refractive index $n_{32}$ at wavelength $\lambda_2$. In the above case, relationships between refractive indices are such that $n_{21} \neq n_{31}$ and $n_{22} \neq n_{32}$. In the thus-configured optical module, dimension α+γ obtained by adding depth a of the first optical waveguide core 1c to thickness γ of the bonding material layer 6 is set such that:

$$\frac{\lambda_1}{2\pi\sqrt{n_{11}^2 - n_{21}^2}} \tan^{-1} \frac{\sqrt{|n_{21}^2 - n_{31}^2|}}{\sqrt{n_{11}^2 - n_{21}^2}} < \quad (1)$$

$$\alpha + \gamma < \frac{\lambda_2}{2\pi\sqrt{n_{12}^2 - n_{22}^2}} \tan^{-1} \frac{\sqrt{|n_{22}^2 - n_{32}^2|}}{\sqrt{n_{12}^2 - n_{22}^2}}.$$

Dimension β+γ obtained by adding depth β of the second optical waveguide core 2c to thickness γ of the bonding material layer 6 is set such that:

$$\beta + \gamma > \frac{\lambda_2}{2\pi\sqrt{n_{12}^2 - n_{22}^2}} \tan^{-1} \frac{\sqrt{|n_{22}^2 - n_{32}^2|}}{\sqrt{n_{12}^2 - n_{22}^2}}. \quad (2)$$

In this manner, by setting depths α and β of the first optical waveguide core 1c and the second optical waveguide core 2c, thickness γ of the bonding material layer 6, and refractive indices of portions of the optical module, it is possible to realize the optical module having a desired wavelength dividing function in which the zero-order mode optical signals, which have wavelengths $\lambda_1$ and $\lambda_2$, respectively, are guided to the second optical waveguide core 2c and only the zero-order mode optical signal having wavelength $\lambda_1$ is guided to the first optical waveguide core 1c.

Referring to FIGS. 1 to 5, the optical signals branch off at the optical connecting portion, so that only the optical signal having a wavelength corresponding to depth α propagates through the first optical waveguide core 1c and exits the end surface 1ca. The optical signal having exited the end surface 1ca enters the light receiving portion 3a of the PD 3.

On the other hand, an optical signal output by the light emitting portion 4a of the LD 4 enters the second optical waveguide core 2c from the end surface 2ca thereof and propagates through the second optical waveguide core 2c to the end surface 2cb. The optical signal enters the optical fiber 5 from its end surface bonded to the end surface 2cb, and propagates through the optical fiber 5.

In the case where the above-described wavelength dividing function is not required, the optical module of the present invention may be configured such that respective depths α and β of the first optical waveguide core 1c and the second optical waveguide core 2c are equal to each other, and the settings as represented by the above expressions (1) and (2) may not be made. In such a case, the optical module of the present invention can be used as an optical module, which does not have the above-described wavelength dividing function, for performing simple optical branching.

As described above, portions of the first optical waveguide core 1c and the second optical waveguide core 2c overlap with each other in the Z-axis direction (a direction perpendicular to the face of FIG. 2) and the overlapping portions form the optical connecting portion. The area of the overlapping portions can be adjusted by adjusting a relative positional relationship between the first substrate 1 and the second substrate 2. Specifically, it is possible to increase/decrease the area of the optical connecting portion where the first optical waveguide core 1c and the second optical waveguide core 2c partially overlap with each other. For example, optical energy, which branches off to the first optical waveguide core 1c, is decreased by relatively decreasing the area of the optical connecting portion, and the optical energy, which branches off to the first optical waveguide core 1c, is increased by relatively increasing the area of the optical connecting portion. Therefore, it is possible to allow the optical signal entering from the optical fiber 5 to branch off to the first optical waveguide core 1c and the second optical waveguide core 2c at a desired branching ratio. It goes without saying that in the case where the optical module is allowed to function as an optical coupler, the ratio of optical energies, which are respectively output from the first optical waveguide core 1c and the second optical waveguide core 2c to the optical fiber 5, can be adjusted by increasing/decreasing the area of the optical connecting portion.

Figure 7:
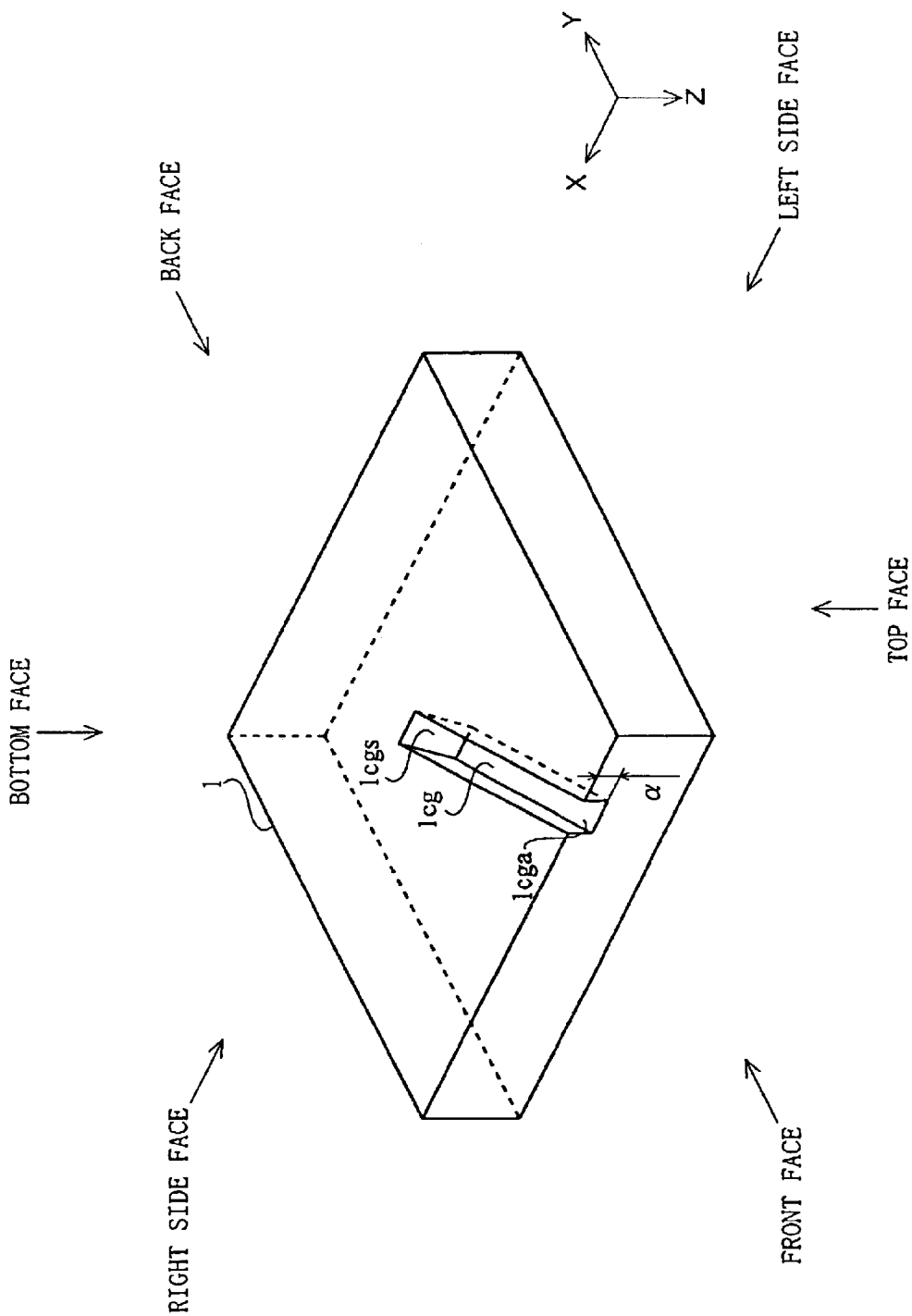
FIG. 7 is a perspective view used for explaining a method for producing the optical module illustrated in FIG. 1 with respect to a detailed structure of a first substrate 1.

Next, referring to FIG. 7, a method for producing the optical module of the present invention will be described in conjunction with the detailed structure of the first substrate 1. FIG. 7 is a perspective view of the first substrate 1 before the first optical waveguide core 1c is formed, which is viewed from the bottom face side. In FIG. 7, a first optical waveguide core groove 1cg is formed in the bottom face of the first substrate 1 so as to be concave with respect thereto. A high refractive index material, such as a glass-based material or a UV curable resin, is injected into the first optical waveguide core groove 1cg, thereby forming the first optical waveguide core 1c. Therefore, the first optical waveguide core groove 1cg is formed so as to have a shape similar to the shape of the first optical waveguide core 1c. The groove depth (a depth in the Z-axis direction) is a and the bottom of the groove 1cg is parallel to the bottom face of the first substrate 1. The first optical waveguide core groove 1*cg* has a substantially rectangular solid-like shape and a drawing direction thereof is a direction extending from the substantial center of the first substrate 1 to a portion, which is positioned so as to deviate a prescribed distance from the center of the front face to the side of a left side face of the first substrate 1 (i.e., a direction which makes a prescribed angle with respect to the Y-axis direction). There is a groove opening 1*cga* at one end of the groove 1*cg* on the front face side. The other end of the first optical waveguide core groove 1*cg* is terminated at a groove inclined surface 1*cgs* formed in the vicinity of the center of the bottom face of the first substrate 1. The inner end of the first optical waveguide core groove 1*cg* is formed between the groove inclined surface 1*cgs* and the bottom face of the first substrate 1, and thus has a narrowing wedge-like shape. The shallowest portion of the first optical waveguide core groove 1*cg* meets the bottom face of the first substrate 1. The groove inclined surface 1*cgs* is used for forming the aforementioned inclined surface 1*cs* of the first optical waveguide core 1*c*. The shape of the groove inclined surface 1*cgs* is similar in detail to the shape of the inclined surface 1*cs* except for the above-described features (see FIG. 1 to 3).

The first substrate 1 is preferably molded from a low refractive index material, such as glass or a transparent resin. A molding die used for molding the first substrate 1 is shaped so as to form the entire first substrate 1 and the first optical waveguide core groove 1*cg*. Therefore, the first substrate 1 having the first optical waveguide core groove 1*cg* formed therein can be readily produced by using the molding die to shape the low refractive index material. A marker 1*m* (not shown) for use in alignment of the PD 3, which will be described later, is also formed at a prescribed position on the top face of the first substrate 1 during the formation of the first substrate 1.

Figure 8:
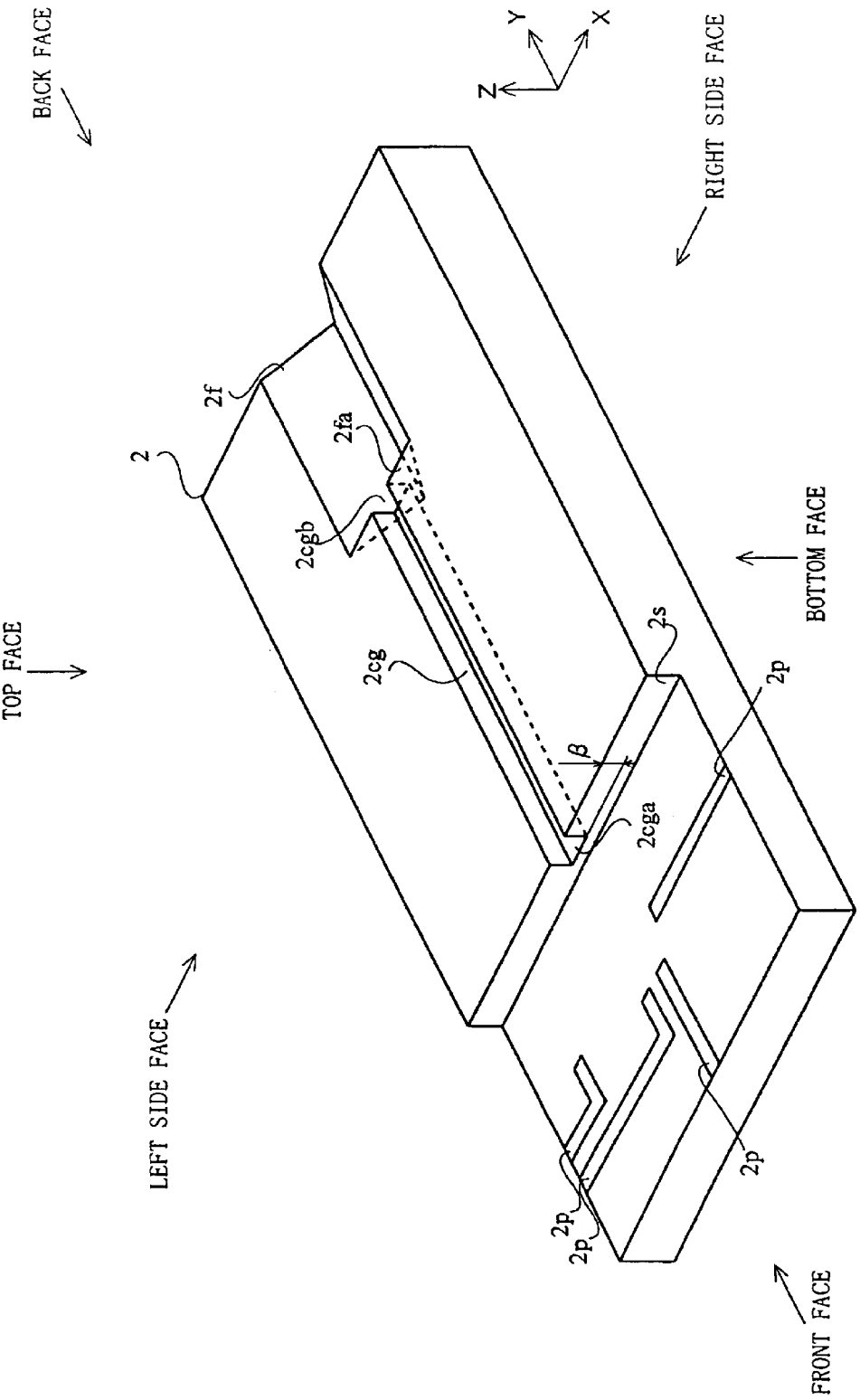
FIG. 8 is a perspective view used for explaining a method for producing the optical module illustrated in FIG. 1 with respect to a detailed structure of a second substrate 2.

Next, referring to FIG. 8, the detailed structure of the second substrate 2 included in the optical module of the present invention will be described. FIG. 8 is a perspective view of the second substrate 2 viewed from the top face side. In FIG. 8, the second substrate 2 has a substantially rectangular solid-like shape. The top face of the second substrate 2 is divided by the step forming surface 2*s* so as to include the upper stage surface and the lower stage surface which are parallel to each other. The step forming surface 2*s* is formed so as to face the front face side of the second substrate 2.

The aforementioned optical fiber positioning groove 2*f* and a second optical waveguide core groove 2*cg* are formed in the upper stage surface of the second substrate 2 so as to be concave with respect thereto. A high refractive index material, such as a glass-based material or a UV curable resin, is injected into the second optical waveguide core groove 2*cg*, thereby forming the second optical waveguide core 2*c*. Therefore, the second optical waveguide core groove 2*cg* is formed so as to have a shape similar to that of the second optical waveguide core 2*c*. The depth of the second optical waveguide core groove 2*cg* (a depth in the Z-axis direction) is β and the bottom of the second optical waveguide core groove 2*cg* is parallel to the upper stage surface of the second substrate 2. As described above, the optical fiber positioning groove 2*f* and the second optical waveguide core groove 2*cg* are formed in the same direction. The second optical waveguide core groove 2*cg* has a substantially rectangular solid-like shape and a drawing direction thereof is the Y-axis direction. The second optical waveguide core groove 2*cg* has a groove opening 2*cga* formed at one end thereof in the step forming surface 2*s*. A groove opening 2*cgb* is formed at the other end of the second optical waveguide core groove 2*cg* in the front face of the optical fiber positioning groove 2*f*. The optical fiber positioning groove 2*f* is formed so as to have an isosceles triangular prism-like shape and a drawing direction thereof is the Y-axis direction. In the optical fiber positioning groove 2*f*, a line through vertices of angles between two equal sides of the isosceles triangles deviates along the Z-axis direction from the central axis of the second optical waveguide core groove 2*cg* in the Y-axis direction so as to be parallel thereto, and two lines through vertices of angles between other combinations of sides of the isosceles triangles extend along the upper stage surface of the second substrate 2. As described above, the optical fiber positioning groove 2*f* is formed such that the optical axis of the optical fiber 5, which is placed along inner faces of the optical fiber positioning groove 2*f*, is aligned with an optical axis of light propagating through the second optical waveguide core 2*c*.

The second substrate 2 is preferably formed using a low refractive index material, such as glass or a transparent resin. A molding die used for molding the second substrate 2 is shaped so as to mold the second optical waveguide core groove 2*cg* and the optical fiber positioning groove 2*f* as well as the entire second substrate 2. Therefore, the second substrate 2 having the second optical waveguide core groove 2*cg* and the optical fiber positioning groove 2*f* formed therein can be readily produced by using the molding die to shape the low refractive index material. A marker 2*m* (not shown) for use in alignment of the LD 4, which will be described later, is also formed at a prescribed position on the lower stage surface of the second substrate 2 during the formation of the second substrate 2.

Figure 9:
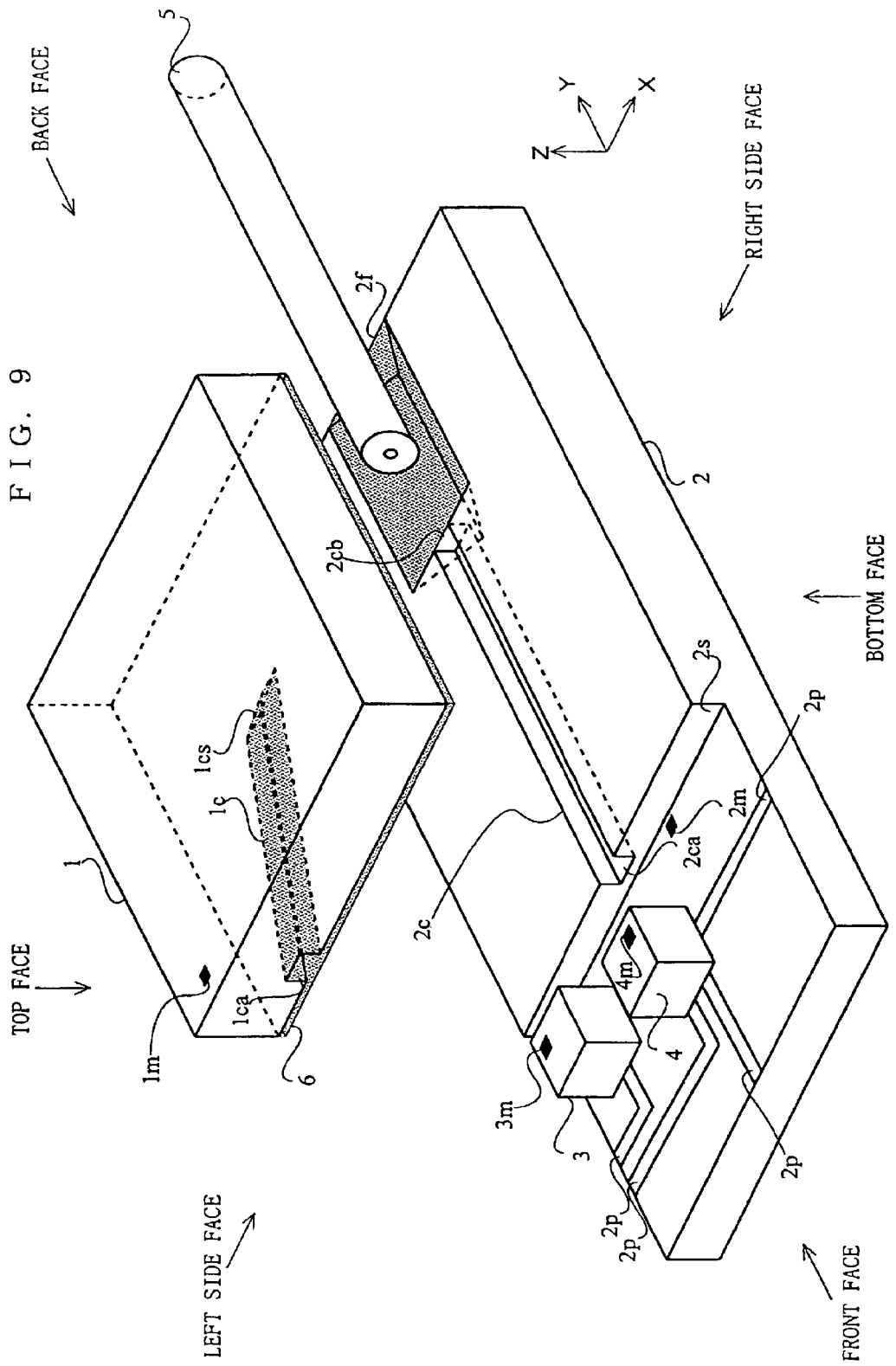
FIG. 9 is a perspective view used for explaining a method for assembling the optical module illustrated in FIG. 1.
Figure 10:
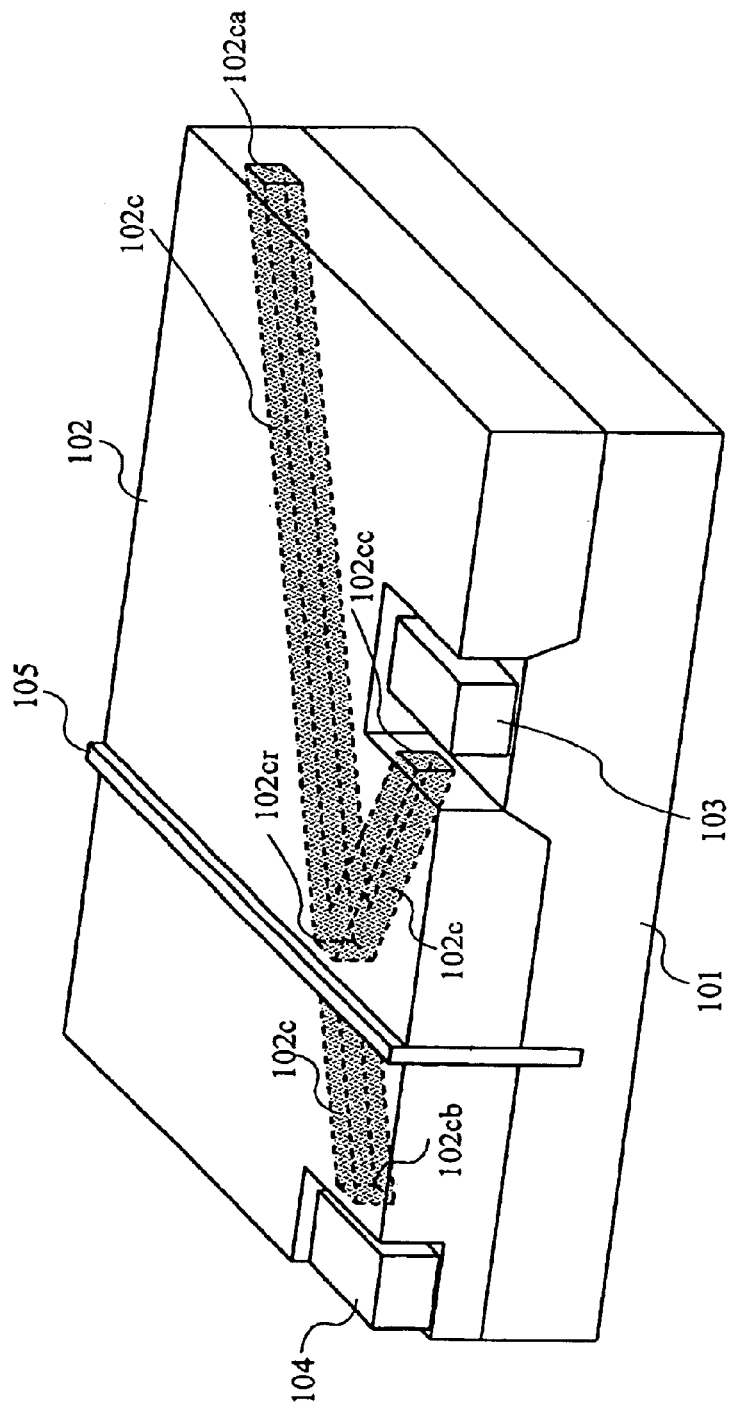
FIG. 10 is a perspective view illustrating an exemplary structure of a conventional optical module.

Next, referring to FIG. 9, a method for assembling the optical module of the present invention will be described. In FIG. 9, firstly, the PD 3 and the LD 4 are mounted on the lower stage surface (mounting surface) of the second substrate 2 at their respective prescribed positions. Preferably, a height from the mounting surface to the center of the light receiving portion 3*a* (see FIG. 2) provided to the PD 3 is set so as to be equal to a height from the mounting surface to the optical axis of the first optical waveguide core 1*c*. Moreover, a height from the mounting surface to the center of the light emitting portion 4*a* (see FIG. 2) provided to the LD 4 is set so as to be equal to a height from the mounting surface to the optical axis of the second optical waveguide core 2*c*. In this manner, the heights to the respective centers of the light receiving portion 3*a* and the light emitting portion 4*a*, the height of the step forming surface 2*s* in the Z-axis direction, etc., are preadjusted such that positions of the respective optical axes of the light receiving portion 3*a*, the light emitting portion 4*a*, the first optical waveguide core 1*c*, and the second optical waveguide core 2*c* are adjusted in the Z-axis direction. Thus, the optical axes of the PD 3 and the LD 4 can be readily aligned with the optical axes of the first optical waveguide core 1*c* and the second optical waveguide core 2*c*, respectively, in the Z-axis direction. Markers 3*m* and 4*m* for use in alignment of the optical axes in the X-axis direction are provided to the PD 3 and the LD 4, respectively. The position of the optical axis of the LD 4 in the X-axis direction is adjusted using the marker 4*m* provided to the LD 4 and the marker 2*m* provided to the lower stage surface of the second substrate 2, and then the LD 4 is mounted on the lower stage surface of the second substrate 2.

Thereafter, a high refractive index bonding material, such as a glass-based material or a UV curable resin, is applied to the entire bottom face of the first substrate 1, so that the a high refractive index bonding material is injected into first optical waveguide core 1*cg*. Preferably, the application of the bonding material is performed by spin coating at a rotation speed in the range between 500 rpm and 8000 rpm. As a result of the application, the first optical waveguide core 1c and the bonding material layer 6 are formed on the bottom face of the first substrate 1.

Then, the bottom face of the first substrate 1 and the upper stage surface of the second substrate 2 are put together so as to be bonded to each other via the bonding material layer 6. As a result of this, the bonding material layer 6 is injected into the second optical waveguide core groove 2cg formed in the second substrate 2. That is, a high refractive index bonding material, such as a glass-based material or a UV curable resin, which forms the bonding material layer 6, is injected into the second optical waveguide core groove 2cg. In this case, the optical axes of the first optical waveguide core 1c and the light receiving portion 3a provided to the PD 3 are not required to be adjusted in the Z-axis direction. However, the optical axes thereof are aligned with each other in the X-axis direction by using the marker 3m provided to the PD 3 and the marker 1m, which is provided on the top face of the first substrate 1 during the formation thereof, so as to move the first substrate 1 based on the position of the PD 3. Thereafter, a high refractive index bonding material, such as a glass-based material or a UV curable resin, is applied to the second substrate 2 bonded to the first substrate 1, so as to be injected into the optical fiber positioning groove 2f. The optical fiber 5 is placed along the optical fiber positioning groove 2f so as to bond an end surface thereof to the front face of the optical fiber positioning groove 2f and the back face of the first substrate 1.

The marker 3m provided to the PD 3 may not be used for aligning the first substrate 1 with the second substrate 2. For example, other markers respectively provided to the first substrate 1 and the second substrate 2 may be used for aligning the first substrate 1 with the second substrate 2. Alternatively, image processing or the like may be used for alignment of the first optical waveguide core 1c and the second optical waveguide core 2c, thereby aligning the first substrate 1 with the second substrate 2. Since the second optical waveguide core 2c and the optical fiber 5 are placed such that their optical axes are aligned with each other, the first substrates 1 and the second substrate 2 may be put together while observing outputs from the optical fiber 5 by using the PD 3, so as to align the first substrate 1 with the second substrate 2. The bonding material layer 6 may be formed on a portion of the upper stage surface of the second substrate 2, which is bonded to the bottom face of the first substrate 1, before putting the first substrate 1 and the second substrate 2 together. In such a case, the bonding material layer 6 is formed by applying a high refractive bonding material, such as a glass-based material or a UV curable resin, to the portion of the upper stage surface of the second substrate 2 so as to be injected into the second optical waveguide core groove 2cg and the optical fiber positioning groove 2f. Preferably, the application of the bonding material is performed by spin coating at a rotation speed in the range between 500 rpm and 8000 rpm. As a result of the application, the second optical waveguide core 2c and the bonding material layer 6 are formed on the upper stage surface of the second substrate 2, and thereafter the first substrate 1 and the second substrate 2 are put together. It goes without saying that the thus-applied bonding material layer 6 achieves a bonding effect similar to the effect of the above-described bonding material layer 6 applied to the bottom face of the first substrate 1.

After the completion of alignment, such as adjustments of the optical axes, bonding portions of the first substrate 1, the second substrate 2, and the optical fiber 5 are irradiated with ultraviolet rays, so as to cure the UV curable resin injected into the bonding portions, the first optical waveguide core groove 1cg, and the second optical waveguide core groove 2cg, so that the first substrate 1, the second substrate 2, and the optical fiber 5 are fixed together. The UV curable resin cured within the first optical waveguide core groove 1cg and the second optical waveguide core groove 2cg has a refractive index, which is higher than refractive indices of the first substrate 1 and the second substrate 2, so as to function as the first optical waveguide core 1c and the second optical waveguide core 2c. In this manner, the optical module having an optical branching and coupling function is completed.

In the above-described adjustments of the optical axes of the optical module, when mounting of the PD 3 and the LD 4 is performed, the positions of the PD 3 and the LD 4 may be adjusted after fixing the first substrate 1 and the second substrate 2 together.

As described above, a glass-based material, a UV curable resin, or the like, which has a refractive index higher than refractive indices of the first substrate 1 and the second substrate 2, is used as the bonding material injected into the first optical waveguide core groove 1cg and the second optical waveguide core groove 2cg, and therefore the bonding material can function as the first optical waveguide core 1c and the second optical waveguide core 2c. By connecting the first optical waveguide core 1c with the second optical waveguide core 2c, it is possible to realize the optical module having an optical branching and coupling function for causing a received optical signal to branch off and coupling optical signals to be transmitted. Further, by increasing/decreasing the area of the optical connecting portion where the first optical waveguide core 1c overlaps with the second optical waveguide core 2c, it is possible to allow an optical signal entering from the optical fiber 5 to branch off to the first optical waveguide core 1c and the second optical waveguide core 2c at a desired branching ratio. It is also possible to adjust the ratio of optical energies, which are respectively output from the first optical waveguide core 1c and the second optical waveguide core 2c to the optical fiber 5. Furthermore, it is easy to adjust the optical axes of the first optical waveguide core 1c and the second optical waveguide core 2c so as to realize the optical branching and coupling function, and therefore the optical module of the present invention can be mass-produced at a low cost. Also, the optical axes of the first optical waveguide core 1c, the second optical waveguide core 2c, the PD 3, and the LD 4 of the optical module can be readily adjusted in the height direction (the Z-axis direction), and optical axes can be readily adjusted in other directions by adjusting the positions of the first substrate 1, etc., along a direction parallel to the upper stage surface of the second substrate 2. Therefore, it is possible to realize reduction in cost, which is advantageous for mass production. Further still, the first optical waveguide core 1c and the second optical waveguide core 2c of the optical module of the present invention can be readily formed, and the first substrate 1 and the second substrate 2 can be readily molded. Thus, it is possible to mass-produce optical modules at a low cost. Further still, by adjusting the size of the first optical waveguide core 1c in cross-section and the refractive indices of the first substrate 1 and the second substrate 2, it is possible to easily realize the optical module further having a wavelength dividing function.

As described above, it is desirable to form the first optical waveguide core groove 1cg, the second optical waveguide core groove 2cg, etc., by molding. However, the present invention is not limited to this, and the first optical waveguide core groove 1cg, the second optical waveguide core groove 2cg, etc., may be formed by etching as necessary. In the above description, the glass-based material or the UV curable resin is injected into the first optical waveguide core groove 1cg and the second optical waveguide core groove 2cg. However, the present invention is not limited to this, and a thermosetting resin, polyimide, or the like may be injected.

In the above description, the PD 3 and the LD 4 are mounted on the lower stage surface of the second substrate 2. However, the present invention is not limited to this, and various components, such as a further optical waveguide having a different core diameter, a lens, an isolator, a filter, a waveplate, etc., may be mounted. Alternatively, in addition to the PD 3 and the LD 4, a semiconductor element, such as an optical semiconductor element driving semiconductor or an amplifier, or LCR parts may be mounted on either the top face (the lower stage surface) or the bottom face of the second substrate 2, or both faces thereof. In the above description, the electrode pattern and the transmission line 2p are formed on the lower stage surface of the second substrate 2. However, another high-frequency circuit board, which has the electrode pattern and the transmission line formed thereon, may be placed on the lower stage surface of the second substrate 2. In the case where the optical module of the present invention is used only for receiving or transmitting an optical signal, a combination of only a plurality of PDs 3 or LDs 4 may be mounted on the lower stage surface of the second substrate 2. Still alternatively, the PD 3 and the LD 4 may be placed in positions opposite to those described above. Specifically, an optical signal output by the LD 4 is transmitted through the first optical waveguide core 1c to the optical fiber 5, and an optical signal received via the optical fiber 5 may be caused to propagate through the second optical waveguide core 2c to exit the end surface 2ca and enter the PD 3.

It goes without saying that an optical transmission line connected to the end surface 2cb of the second optical waveguide core 2c is not limited to the optical fiber 5, and various types of optical transmission lines can be connected thereto. A plurality of optical fibers can be placed. An isolator, a lens, a filter, a waveplate, etc., may be placed instead of placing the optical fiber 5.

Although an exemplary combination of two straight-lined optical waveguides has been described, the present invention is not limited to this and is applicable to all the generally available optical waveguide patterns. Thus, it is possible to control curving, branching, and coupling of light waves. The inclined surface 1cs are not necessarily provided to the first optical waveguide core 1c. For example, a similar optical branching and coupling function can also be realized even by configuring the first optical waveguide core 1c so as to have an end surface vertical to the optical axis thereof so long as the optical connecting portion is formed between the first optical waveguide core 1c and the second optical waveguide core 2c.

While the invention has been described in detail, the foregoing description is in all aspects illustrative and not restrictive. It is understood that numerous other modifications and variations can be devised without departing from the scope of the invention.

What is claimed is:

1. An optical module for causing an optical signal to branch off, or coupling optical signals, so as to propagate through an optical waveguide and an optical element, the optical module comprising:

a first substrate having a first optical waveguide core formed therein, the first optical waveguide core being parallel to a bottom face of the first substrate;

a second substrate having a second optical waveguide core therein, the second optical waveguide core being parallel to a top face of the second substrate;

an optical fiber fixed to at least one of the first and second substrates; and a plurality of optical elements mounted on a part of the top face of the second substrate so as to be optically connected to an end surface of each of the first and second optical waveguide cores, wherein an optical connecting portion is formed between the first and second optical waveguide cores by bonding the bottom face of the first substrate to the top face of the second substrate so as to overlap with each other, the first and second waveguide cores partially being in contact with each other.

2. The optical module according to claim 1, wherein:

the first optical waveguide core is formed by injecting a first high refractive index material having a relatively high refractive index into a first concave groove which is formed so as to be parallel to the bottom face of the first substrate;

the second optical waveguide core is formed by injecting a second high refractive index material having a relatively high refractive index into a second concave groove which is formed so as to be parallel to the top face of the second substrate; and the bottom face of the first substrate and the top face of the second substrate are bonded together by a third high refractive index material having a relatively high refractive index.

3. The optical module according to claim 1, wherein:

the first and second substrates have respective different refractive indices; and cross sections of the first and second optical waveguide cores are different from each other in at least one of width and height.

4. The optical module according to claim 1, wherein an area of the optical connecting portion is increased or decreased by adjusting a relationship between the bottom face of the first substrate and the top face of the second substrate with respect to a bonding position.

5. The optical module according to claim 2, wherein the first and second high refractive index materials, which are respectively injected into the first and second concave grooves, and the third high refractive index material, which bonds the bottom face of the first substrate to the top face of the second substrate, are ultra violet curable resins of the same type.

6. The optical module according to claim 2, wherein the first and second high refractive index materials, which are respectively injected into the first and second concave grooves, and the third high refractive index material, which bonds the bottom face of the first substrate to the top face of the second substrate, are glass-based materials of the same type.

7. The optical module according to claim 2, wherein the first and second substrates are molded together with the first and second concave grooves from a low refractive index glass-based resin.

8. The optical module according to claim 2, wherein the first and second substrates are molded together with the first and second concave grooves from a low refractive index transparent resin.

9. The optical module according to claim 2, wherein an optical fiber positioning groove is formed on at least one of the first and second substrates, the optical fiber positioning groove aligning an optical axis of the optical fiber with an optical axis of another end surface of either the first or second optical waveguide core by fixing the optical fiber to the optical fiber positioning groove along inner surfaces thereof.

10. The optical module according to claim 9, wherein each of the first and second substrate is formed by molding which uses a molding die for shaping at least one groove selected from the group consisting of the first concave groove, the second concave groove, and the optical fiber positioning groove.

11. The optical module according to claim 1, wherein:

the plurality of optical elements are optical semiconductor elements;

a transmission line is formed on the top face of the second substrate; and the plurality of optical elements are electrically connected to the transmission line.

12. The optical module according to claim 11, wherein the transmission line is either a microstrip line or a coplanar line.

* * * * *